US012684264B2

(12) United States Patent
Mizoguchi

(10) Patent No.: US 12,684,264 B2
(45) Date of Patent: Jul. 14, 2026

(54) PHOTOELECTRIC CONVERSION DEVICE AND PHOTOELECTRIC CONVERSION SYSTEM

(71) Applicant: CANON KABUSHIKI KAISHA, Tokyo (JP)

(72) Inventor: Masahiko Mizoguchi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/976,727

(22) Filed: Dec. 11, 2024

(65) Prior Publication Data

US 2025/0203242 A1 Jun. 19, 2025

(30) Foreign Application Priority Data

Dec. 14, 2023 (JP) ................................. 2023-211224

(51) Int. Cl.
| | |
|---|---|
| *H04N 25/77* | (2023.01) |
| *G01C 3/08* | (2006.01) |
| *G06T 7/55* | (2017.01) |
| *H04N 25/53* | (2023.01) |

(52) U.S. Cl.
CPC ............. *H04N 25/77* (2023.01); *G01C 3/085* (2013.01); *G06T 7/55* (2017.01); *H04N 25/53* (2023.01); *G06T 2207/30252* (2013.01)

(58) Field of Classification Search
CPC ...... H04N 25/77; H04N 25/53; H04N 25/773; G01C 3/085; G06T 7/55; G06T 2207/30252
See application file for complete search history.

(56) References Cited

U.S. PATENT DOCUMENTS

| | | | |
|---|---|---|---|
| 2013/0020471 A1* | 1/2013 | Korekado ............. | H03M 1/123 |
| | | | 250/206 |
| 2017/0155859 A1* | 6/2017 | Lee ........................ | H03M 1/123 |
| 2021/0051279 A1* | 2/2021 | Tochigi .................. | H04N 25/53 |
| 2022/0006965 A1 | 1/2022 | Zhu | |
| 2022/0120610 A1* | 4/2022 | Numata ................. | H04N 25/57 |
| 2023/0388678 A1 | 11/2023 | Omodani | |

FOREIGN PATENT DOCUMENTS

| | | |
|---|---|---|
| JP | 2020-96347 A | 6/2020 |
| JP | 2021-93583 A | 6/2021 |
| JP | 2023-183170 A | 12/2023 |
| WO | 2023/243381 A1 | 12/2023 |

* cited by examiner

*Primary Examiner* — Michael E Teitelbaum
(74) *Attorney, Agent, or Firm* — VENABLE LLP

(57) ABSTRACT

A photoelectric conversion device includes a pixel unit including a photoelectric conversion unit, a count unit, a count control unit for controlling the count unit, and a determination unit for performing a determination processing of determining a change in the amount of light incident. An exposure period includes at least first and second periods. The count control unit controls to output a difference value between a first count value in the first period and a second count value in the second period. The determination unit performs the determination process based on the difference value. When the difference value is not more than a threshold value, the count control unit starts a count operation in a third period from the first count value. The determination unit further performs the determination processing based on a difference value between the first count value and a third count value in the third period.

21 Claims, 27 Drawing Sheets

| C | C | C | C |
|---|---|---|---|
| C | C | C | C |
| C | C | C | C |
| C | C | C | C |

GRAYSCALE

FIG. 2B

| G | R | G | R |
|---|---|---|---|
| B | G | B | G |
| G | R | G | R |
| B | G | B | G |

RGGB

FIG. 2C

| G | R | G | R |
|---|---|---|---|
| B | C | B | C |
| G | R | G | R |
| B | C | B | C |

RGCB

FIG. 2D

| C | R | C | R |
|---|---|---|---|
| B | C | B | C |
| C | R | C | R |
| B | C | B | C |

RCCB

Figure 24:
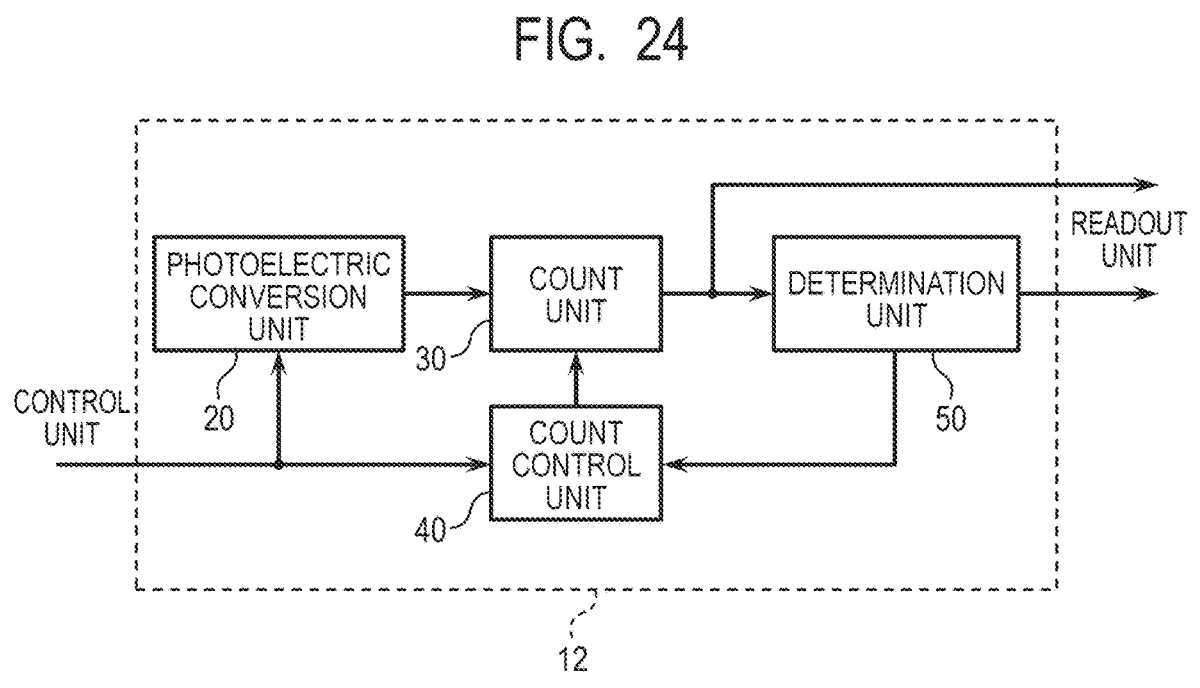

PHOTOELECTRIC
CONVERSION
UNIT

20

COUNT
UNIT

30

DETERMINATION
UNIT

50

READOUT
UNIT

CONTROL
UNIT

COUNT
CONTROL
UNIT

Figure 25:
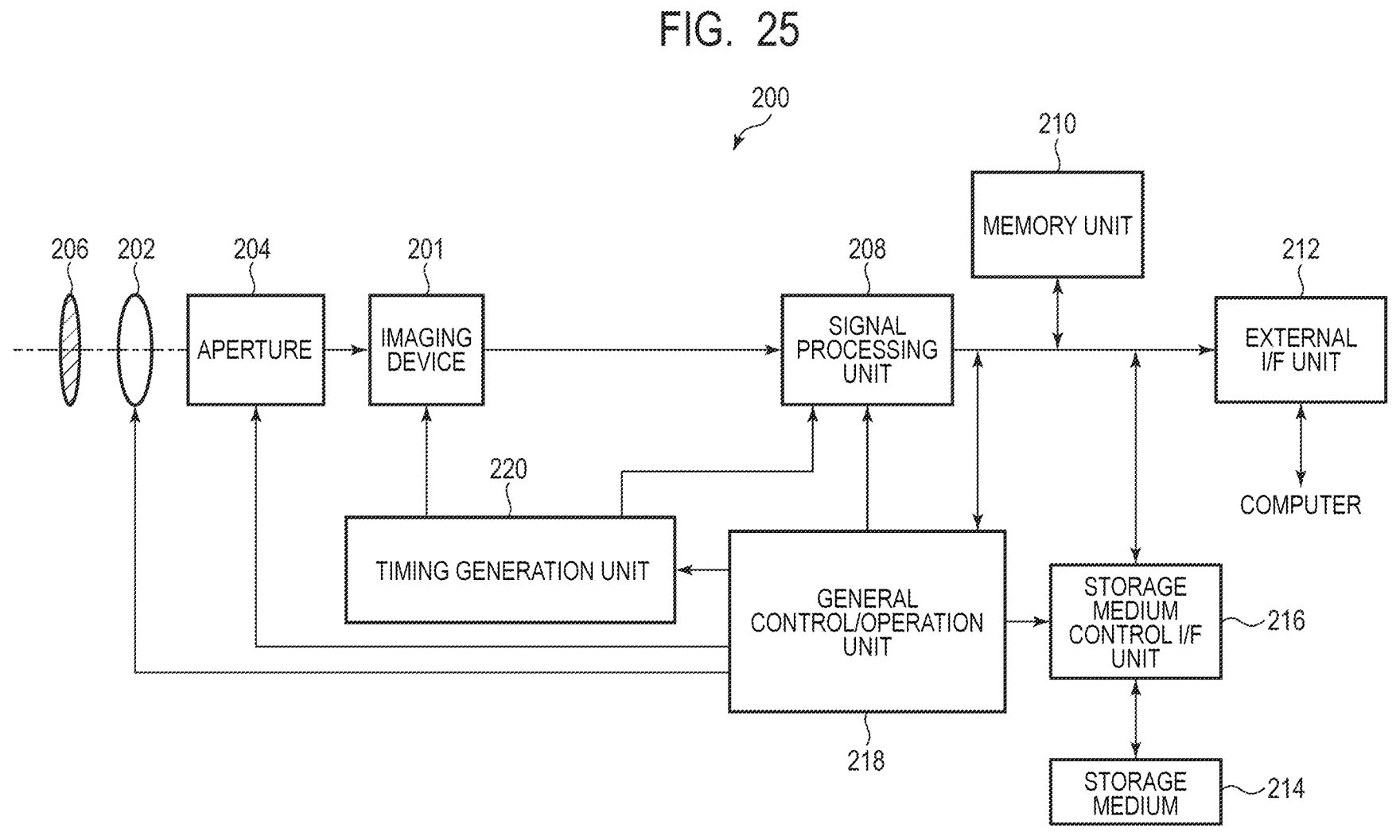

212 EXTERNAL I/F UNIT

COMPUTER

216 STORAGE MEDIUM CONTROL I/F UNIT

214 STORAGE MEDIUM

210 MEMORY UNIT

208 SIGNAL PROCESSING UNIT

218 GENERAL CONTROL/OPERATION UNIT

220 TIMING GENERATION UNIT

201 IMAGING DEVICE

204 APERTURE

202

206

PHOTOELECTRIC CONVERSION DEVICE AND PHOTOELECTRIC CONVERSION SYSTEM

BACKGROUND

Technical Field

The present disclosure relates to a photoelectric conversion device and a photoelectric conversion system.

Description of Related Art

Along with the recent widespread use of technologies such as internet of things (IoT), artificial intelligence (AI), and automated driving, there is a need for an image sensor that consumes less power and can operate at a higher speed than before. One of them is an event-based sensor (also called a dynamic vision sensor). In this sensor, each of the event detection pixels arranged in a two-dimensional array monitors a change in the amount of incident light, and generates one of information in a case where the amount of incident light increases (occurrence of an on-event), in a case where the amount of incident light decreases (occurrence of an off-event), or in a case where the amount of incident light does not change (no occurrence of an event). By outputting this information only from an event detection pixel in which an on-event or an off-event has occurred, low-power consumption and high-speed operation are possible.

On the other hand, since the output of the event detection pixel is three-valued data, the image quality of the image data deteriorates as compared with the conventional synchronous solid-state imaging devices. From such a viewpoint, Japanese Patent Application Laid-Open No. 2020-096347 discloses a technique of generating higher-quality image data while detecting an event by combining an event detection pixel with a counting pixel capable of outputting multi-bit luminance information. In the solid-state imaging device described in Japanese Patent Application Laid-Open No. 2020-096347, the image quality at low illuminance is improved by using single photon avalanche diode (SPAD) pixels capable of counting the number of photons.

However, an attempt to configure an event detection pixel using SPAD for the purpose of improving the event detection sensitivity at low illuminance requires a memory for storing a count value, a subtractor, a comparator, and the like, and thus the circuit scale of the event detection pixel increases. As a result, the resolution of the event detection pixels may be decreased, or the resolution of the counting pixels may be decreased due to an increase in the number of event detection pixels.

SUMMARY

An object of the present disclosure is to provide a photoelectric conversion device capable of detecting an event with high resolution while suppressing a circuit scale.

According to one disclosure of the present specification, there is provided a photoelectric conversion device including a pixel unit including a photoelectric conversion unit configured to output a pulse signal in response to incidence of light, a count unit including a counter configured to count the pulse signal output from the photoelectric conversion unit during a predetermined exposure period and a count value holding unit configured to hold a count value of the counter, a count control unit configured to control the count unit, and a determination unit configured to perform a determination processing of determining whether or not there is a change in an amount of light incident on the photoelectric conversion unit based on a count value of the counter, wherein the exposure period includes a plurality of periods including at least a first period and a second period, wherein the count control unit is configured to control the count unit to output a difference value between a first count value in the first period and a second count value in the second period, wherein the determination unit is configured to perform the determination processing based on the difference value, wherein the count control unit is configured to control the counter, when the difference value is equal to or less than a predetermined threshold value, to read out the first count value held by the count value holding unit to the counter and start a count operation in a third period of the exposure period from the first count value, and wherein the determination unit is configured to further perform the determination processing based on a difference value between the first count value and a third count value in the third period.

Further features of the present invention will become apparent from the following description of exemplary embodiments with reference to the attached drawings.

BRIEF DESCRIPTION OF THE DRAWINGS

FIG. 1 is a block diagram illustrating a schematic configuration of a photoelectric conversion device according to a first embodiment.

FIG. 2A, FIG. 2B, FIG. 2C, and FIG. 2D are diagrams illustrating an example of a color filter array of the photoelectric conversion device according to the first embodiment.

FIG. 8 is a block diagram illustrating a configuration example of a count unit, a count control unit, and a determination unit of a photoelectric conversion device according to a second embodiment.

FIG. 13 and FIG. 14 are timing charts illustrating a method of driving the photoelectric conversion device according to the third embodiment.

FIG. 24 is a block diagram illustrating a configuration example of a count unit, a count control unit, and a determination unit of a photoelectric conversion device according to a modification of the embodiments.

FIG. 25 is a block diagram illustrating a schematic configuration of an imaging system according to a seventh embodiment.

DESCRIPTION OF THE EMBODIMENTS

Preferred embodiments of the present invention will now be described in detail in accordance with the accompanying drawings.

First Embodiment

Figure 1:
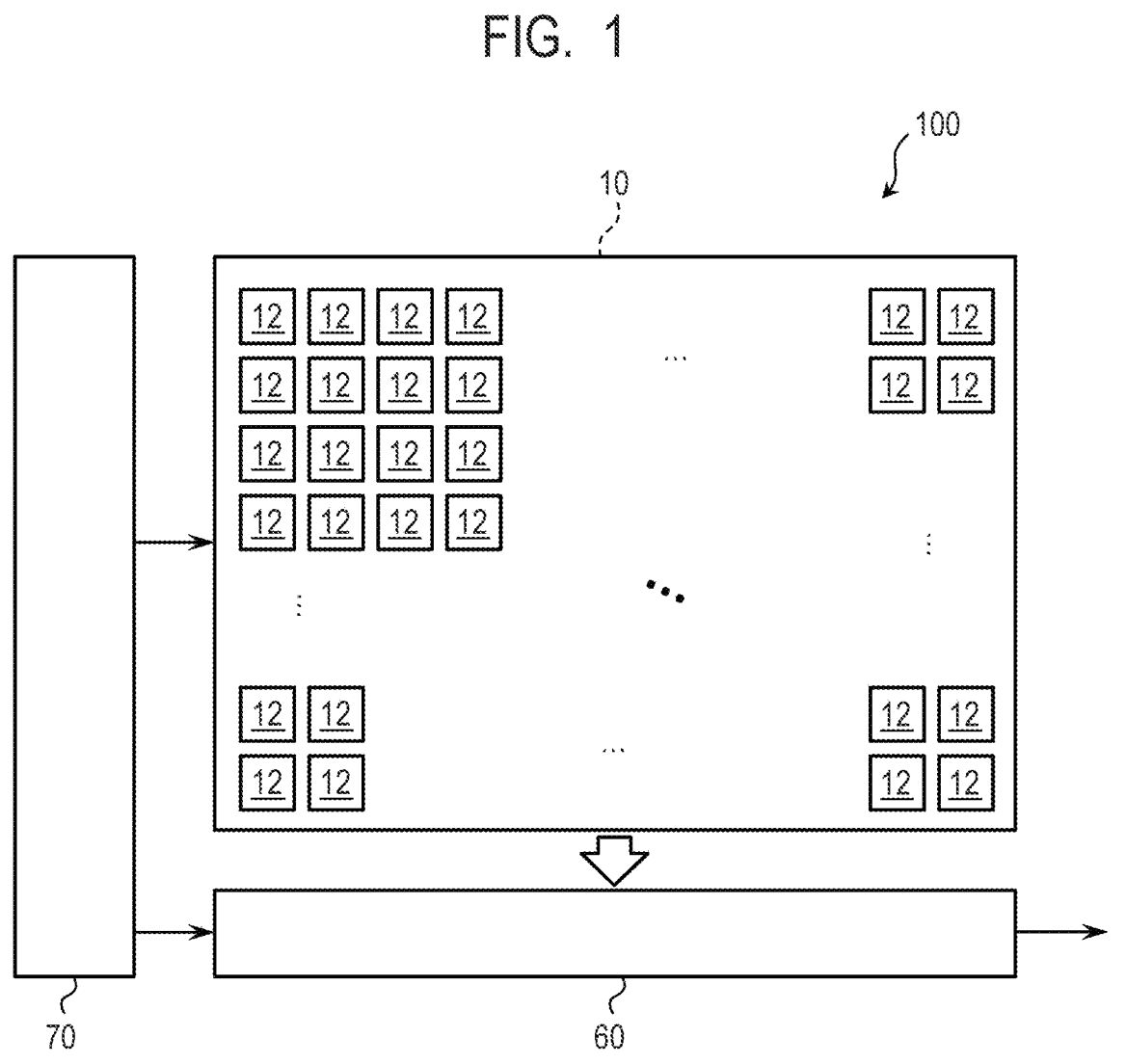
Figures 2A, 2B, 2C, 2D:
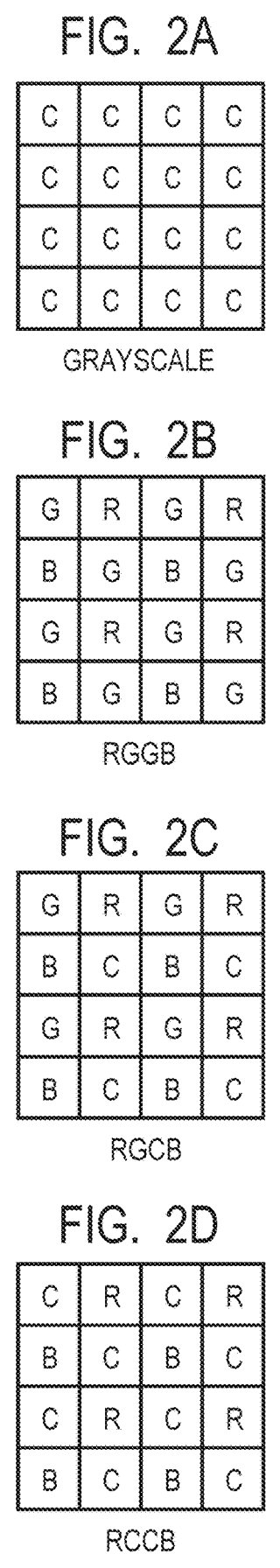
Figure 3:
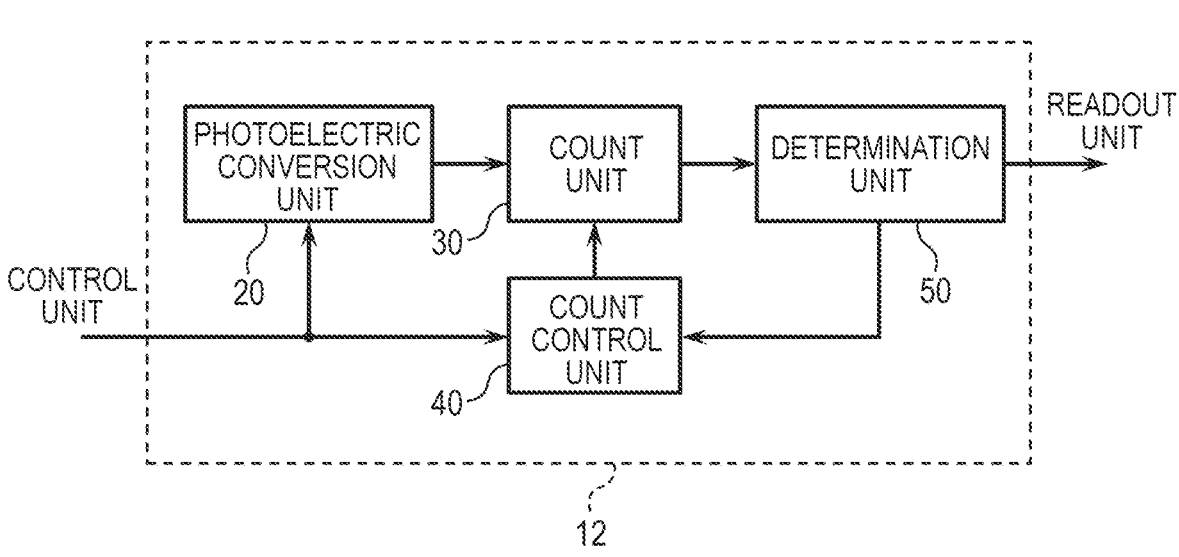
FIG. 3 is a block diagram illustrating a configuration example of a pixel unit of the photoelectric conversion device according to the first embodiment.
Figure 4:
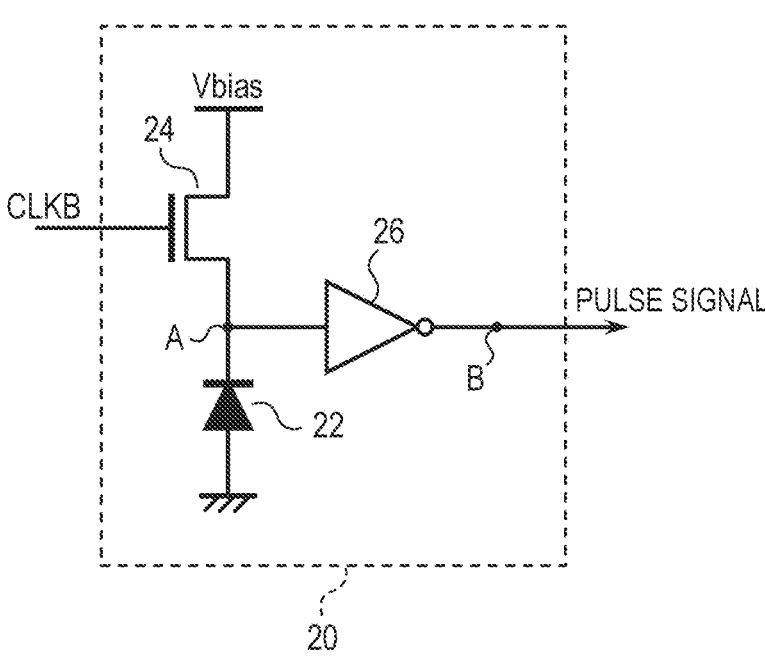
FIG. 4 is a circuit diagram illustrating a configuration example of a photoelectric conversion unit of the photoelectric conversion device according to the first embodiment.
Figure 5:
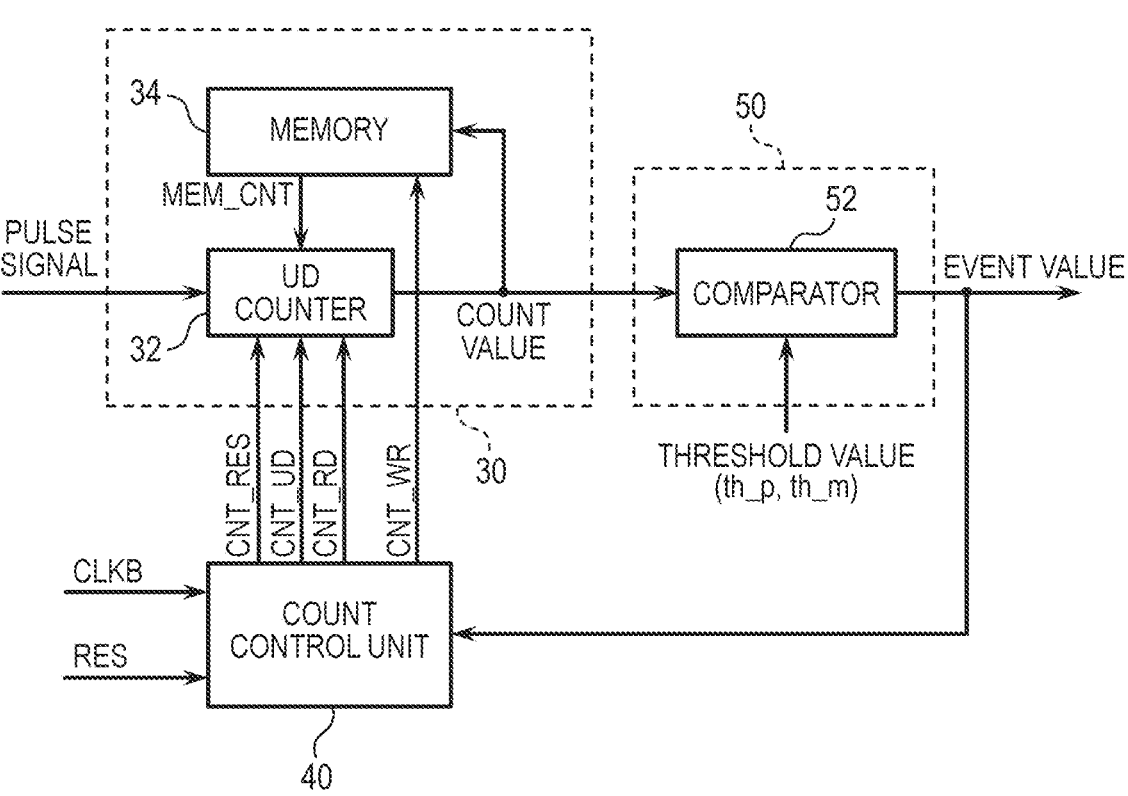
FIG. 5 is a block diagram illustrating a configuration example of a count unit, a count control unit, and a determination unit of the photoelectric conversion device according to the first embodiment.

A photoelectric conversion device according to a first embodiment of the present disclosure will be described with reference to FIG. 1 to FIG. 5. FIG. 1 is a block diagram illustrating a schematic configuration of a photoelectric conversion device according to the present embodiment. FIG. 2A to FIG. 2D are diagrams illustrating an example of a color filter array of the photoelectric conversion device according to the present embodiment. FIG. 3 is a block diagram illustrating a configuration example of a pixel unit of the photoelectric conversion device according to the present embodiment. FIG. 4 is a circuit diagram illustrating a configuration example of a photoelectric conversion unit of the photoelectric conversion device according to the present embodiment. FIG. 5 is a block diagram illustrating a configuration example of a count unit, a count control unit, and a determination unit of the photoelectric conversion device according to the present embodiment.

As illustrated in, e.g., FIG. 1, the photoelectric conversion device according to the present embodiment may include a pixel array unit 10, a readout unit 60, and a control unit 70. The pixel array unit 10 is connected to the readout unit 60. The control unit 70 is connected to the pixel array unit 10 and the readout unit 60.

The pixel array unit 10 is provided with a plurality of pixel units 12 arranged to form a plurality of rows and a plurality of columns. Each of the plurality of pixel units 12 has a function of detecting a change in the amount of incident light as event information. The number of pixel units 12 included in the pixel array unit 10 is not particularly limited. For example, the pixel array unit 10 may be configured by a plurality of pixel units 12 arranged in an array of several thousand rows by several thousand columns as in a general digital camera. Alternatively, the pixel array unit 10 may include a plurality of pixel units 12 arranged in one row or one column. Alternatively, the pixel array unit 10 may include one pixel unit 12.

The pixel array unit 10 may be provided with color filters (hereinafter, referred to as CF) of various arrangements illustrated in FIG. 2A to FIG. 2D, for example. FIG. 2A to FIG. 2D illustrate an example of the CF array in the pixel units 12 of (four columns×four rows). FIG. 2A illustrates a case where all the pixel units 12 are formed of clear (C) pixels that do not include CFs. According to the configuration of FIG. 2A, sensitivity in a dark place may be increased. FIG. 2B is a CF array called a Bayer array and is a case of an RGGB array including an R-pixel having CF transmitting light in a red (R) wavelength range, a G-pixel having CF transmitting light in a green (G) wavelength range, and a B-pixel having CF transmitting light in a blue (B) wavelength range. According to the configuration of FIG. 2B, it is possible to acquire information for each color. FIG. 2C illustrates the case of the RGCB array in which a part of the G-pixels in the Bayer array is replaced with C-pixels. FIG. 2D illustrates the case of the RCCB array in which the G pixels in the Bayer array are replaced with the C-pixels. According to the configurations of FIG. 2C and FIG. 2D, in addition to the information for each color, information may be acquired with higher sensitivity by the C-pixel. The CF array may be appropriately selected according to an application or the like in which the photoelectric conversion device is used and is not limited to those illustrated in FIG. 2A to FIG. 2D.

The readout unit 60 has a function of reading out event information detected by the pixel array unit 10 and outputting the event information to an external device (not illustrated). Readout of information from the pixel array unit 10 may be performed for each pixel unit 12 or may be performed simultaneously in parallel from a plurality of pixel units 12. When the readout is simultaneously performed from the plurality of pixel units 12, for example, the readout may be performed in units of rows or columns. Alternatively, for example, only a row including a pixel unit 12 in which an event is detected may be read out. In this case, in order to specify the position of the pixel unit 12 where the event is detected, the row address may be added to the event value and output. Similarly, in the case of a configuration in which only a column including a pixel unit 12 in which the event is detected is read out, the column address may be added to the event value and output. Furthermore, a configuration in which rows and columns are combined and read out for each pixel block (a rectangular area including a plurality of pixel units 12) in which an event is detected may be employed.

The control unit 70 has a function of controlling operations and timings of the pixel array unit 10 and the readout unit 60. The control unit 70 generates control signals for controlling operations and timings of the pixel array unit 10 and the readout unit 60, and outputs the generated control signals to the pixel array unit 10 and the readout unit 60. The control signals supplied from the control unit 70 to the pixel array unit 10 and the readout unit 60 may include, for example, a reset signal for initialization of the pixel unit 12, a synchronization signal for determining an exposure period, a timing signal for controlling a readout period, and a setting signal such as a threshold value for detecting an event.

Next, a configuration example of the pixel unit 12 included in the pixel array unit 10 will be described with reference to FIG. 3. Each of the pixel units 12 may include, as illustrated in, e.g., FIG. 3, a photoelectric conversion unit 20, a count unit 30, a count control unit 40, and a determination unit 50. The control signals from the control unit 70 are supplied to the photoelectric conversion unit 20 and the count control unit 40. The photoelectric conversion unit 20 and the count control unit 40 are connected to the count unit 30. The count unit 30 is connected to the determination unit 50. The determination unit 50 is connected to the count control unit 40 and the readout unit 60.

The control signal supplied from the control unit 70 to the photoelectric conversion unit 20 may include a signal CLKB that is an inverted signal of the synchronization signal CLK. The signal CLKB may be used as a synchronization signal for determining an exposure period of the photoelectric conversion unit 20. The control signal supplied from the control unit 70 to the count control unit 40 may include the signal CLKB and a reset signal RES of the counter.

The photoelectric conversion unit 20 outputs pulse signals with one or more pulses corresponding to the amount of light incident during the exposure period defined by the signal CLKB to the count unit 30. The count unit 30 counts the pulse signals output from the photoelectric conversion unit 20 in accordance with a control signal from the count control unit 40. The count unit 30 performs exposure processes in an exposure period in which the count value is increased (up-counting) and an exposure period in which the count value is decreased (down-counting) each at least once, and outputs difference information of the count values obtained in these exposure periods as the count value of the pixel unit 12. The count control unit 40 generates a control signal for controlling the count value and the count direction of the count unit 30 according to the signal CLKB and the reset signal RES supplied from the control unit 70, and outputs the generated control signal to the count unit 30. The determination unit 50 determines the presence or absence of a change in the light amount based on the count value output from the count unit 30, and outputs the determination result as event information.

Next, a configuration example of the photoelectric conversion unit 20 included in the pixel unit 12 will be described with reference to FIG. 4. As illustrated in, e.g., FIG. 4, the photoelectric conversion unit 20 may include a photoelectric conversion element 22, a switch unit 24, and a waveform shaping unit 26. The photoelectric conversion element 22 may be configured by an avalanche photodiode (hereinafter referred to as "APD"). The switch unit 24 may be configured by a switch element such as a MOS transistor.

In the present embodiment, a case where the switch unit 24 is formed of an n-channel MOS transistor is described as an example, but the switch unit 24 may be formed of a p-channel MOS transistor. The waveform shaping unit 26 may be configured by a logic circuit such as an inverter circuit.

An anode of the APD constituting the photoelectric conversion element 22 is connected to the ground voltage node. A cathode of the APD constituting the photoelectric conversion element 22 is connected to a source of the n-channel MOS transistor constituting the switch unit 24. A drain of the n-channel MOS transistor constituting the switch unit 24 is connected to a node to which a voltage Vbias is supplied. An input node of the waveform shaping unit 26 is connected to a connection node (node-A) between the photoelectric conversion element 22 and the switch unit 24. An output node (node-B) of the waveform shaping unit 26 corresponds to an output node of the photoelectric conversion unit 20. The signal CLKB is input from the control unit 70 to a gate of the n-channel MOS transistor constituting the switch unit 24.

The photoelectric conversion element 22 may be configured by an APD as described above. The voltage Vbias is set to apply, to the APD, a reverse bias voltage sufficient for the APD to perform the avalanche multiplication operation. In one example, a positive high voltage of, for example, about +20 V is applied as the voltage Vbias. When a reverse bias voltage sufficient to perform the avalanche multiplication operation is supplied to the APD, carriers generated by photoelectric conversion due to light incident on the APD cause avalanche multiplication, and an avalanche current is generated. The operation modes in a state where the reverse bias voltage is supplied to the APD include a Geiger mode and a linear mode. The Geiger mode is an operation mode in which a voltage applied between the anode and the cathode is set to a reverse bias voltage larger than the breakdown voltage of the APD. The linear mode is an operation mode in which a voltage applied between the anode and the cathode is set to a reverse bias voltage close to or lower than the breakdown voltage of the APD. An APD that operates in Geiger mode is referred to as a single photon avalanche diode (SPAD). The APD constituting the photoelectric conversion element 22 may operate in a linear mode or a Geiger mode.

The voltage Vbias applied to the cathode side of the photoelectric conversion element 22 is not necessarily a positive high voltage. For example, a power supply voltage of about 1 V to several V may be applied to the cathode side of the photoelectric conversion element 22, and a negative high voltage may be applied to the anode side of the photoelectric conversion element 22. The reverse bias voltage applied between the anode and the cathode of the photoelectric conversion element 22 is not necessarily 20 V and may be appropriately set according to the breakdown voltage of the APD.

The switch unit 24 has a function of controlling the supply of the voltage Vbias to the APD. That is, the switch unit 24 is turned on in response to the high-level signal CLKB from the control unit 70 to supply the voltage Vias to the node-A, thereby allowing the APD to perform the avalanche multiplication operation. In addition, the switch unit 24 stops the supply of the voltage Vbias to the node-A by being turned off upon receiving the low-level signal CLKB from the control unit 70 and prohibits the avalanche multiplication operation in the APD. In addition, the switch unit 24 also has a function as a quenching element using the resistance component of the n-channel MOS transistor, that is, a resistive element for stopping the avalanche multiplication phenomenon of the APD.

The waveform shaping unit 26 has a function of shaping the voltage waveform at the node-A and converting the voltage waveform into a pulse signal (photon detection signal) indicating that a photon has entered the photoelectric conversion element 22. That is, the waveform shaping unit 26 outputs a high-level signal (photon detection signal) when the voltage of the node-A is lower than a predetermined determination threshold value, and outputs a low-level signal when the voltage of the node-A is higher than the predetermined determination threshold value.

The operation of the photoelectric conversion unit 20 when a single photon enters the APD will be described below. When the signal CLKB transitions to high-level and the switch unit 24 is turned on, the voltage Vbias is applied to the anode of the APD through the switch unit 24, and the node-A is at high-level. When a photon enters the APD in this state, an electron-hole pair is generated by photoelectric conversion, and an avalanche multiplication phenomenon occurs by using these carriers as seeds. When an avalanche current flows through the APD due to the avalanche multiplication phenomenon, a voltage drop occurs due to the resistance component (quenching resistance) of the switch unit 24, and the bias voltage applied to the APD starts to drop. When the bias voltage drops to the breakdown voltage, the avalanche multiplication phenomenon stops, and the node-A is at low-level. As a result, no avalanche current flows through the APD, the voltage Vbias is again applied to the cathode of the APD, and the node-A returns to high-level.

As a result, the voltage of the node-A transitions from high-level to low-level along with the incidence of the photon on the APD, and then transitions from low-level to high-level. As a result, the output signal of the waveform shaping unit 26, that is, the voltage of the node-B transitions from low-level to high-level and then transitions from high-level to low-level in response to the change in the signal level of the node-A. The pulse signal output in this manner is a photon detection signal indicating that a photon has entered the photoelectric conversion element 22.

Next, a configuration example of the count unit 30, the count control unit 40, and the determination unit 50 included in the pixel unit 12 will be described with reference to FIG. 5. As illustrated in, e.g., FIG. 5, the count unit 30 includes an up-down (UD) counter 32 capable of performing both up-counting and down-counting, and a memory 34 serving as a count value holding unit. The determination unit 50 includes a comparator 52.

The count control unit 40 receives the signal CLKB and the reset signal RES from the control unit 70, and the event value that is an output signal of the determination unit 50, and generates control signals CNT_RES, CNT_UD, CNT_WR, and CNT_RD. Here, the control signal CNT_RES is a reset signal for resetting the UD counter 32. The control signal CNT_UD is a signal for switching between up-counting and down-counting of the UD counter 32. For example, the UD counter 32 performs up-counting when the control signal CNT_UD is at high-level and performs down-counting when the control signal CNT_UD is at low-level. The control signal CNT_WR is a signal for controlling writing of the count value to the memory 34. The control signal CNT_RD is a control signal for controlling reading out of the count value (MEM_CNT) stored in the memory 34 to the UD counter 32.

The pulse signal from the photoelectric conversion unit 20, the control signals CNT_RES, CNT_UD, and CNT_RD from the count control unit 40, and the memory value MEM_CNT from the memory 34 are input to the UD counter 32. The control signal CNT_WR from the count control unit 40 and a count value that is an output of the UD counter 32 are input to the memory 34. The count value which is the output of the UD counter 32, a positive threshold value th_p, and a negative threshold value th_m are input to the comparator 52 of the determination unit 50.

An event value, which is an output signal of the determination unit 50, is generated based on the comparison result in the comparator 52. That is, the comparator 52 compares the count value, which is the output signal of the count unit 30, with the positive threshold value th_p and the negative threshold value th_m, and detects the event when the count value exceeds the positive threshold value th_p or falls below the negative threshold value th_m. For example, the event value may be defined by the following Expression (1).

$$\text{Event Value} = \begin{cases} 1 & (\text{Count Value} > th_p) \\ -1 & (\text{Count Value} < th_m) \\ 0 & (\text{Other Than The Above}) \end{cases} \quad (1)$$

The event value 1 indicates that a change has occurred in which the pixel unit 12 becomes brighter, that is, an on-event has occurred. The event value −1 indicates that a change has occurred in which the pixel unit 12 becomes dark, that is, an off-event has occurred. The event value 0 indicates that no event has occurred. The Expression (1) is an example of expressions of the event values, and other expressions such as assigning different numerical values to respective states of an on-event, an off-event, and no-event, and handling as one type of event value without distinguishing between an on-event and an off-event may be used. The event value may be updated in synchronization with the rising edge (positive edge) of the signal CLKB.

Figure 6:
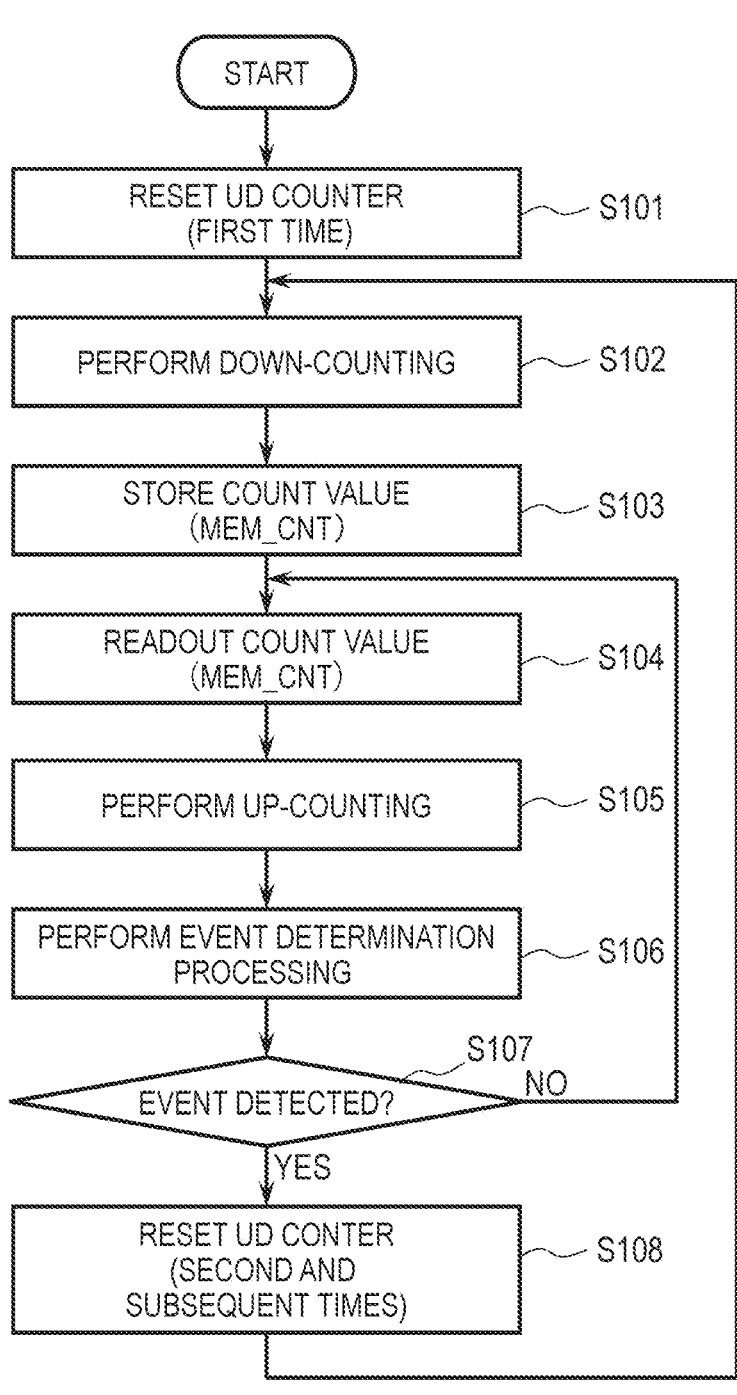
FIG. 6 is a flowchart illustrating a method of driving the photoelectric conversion device according to the first embodiment.
Figure 7:
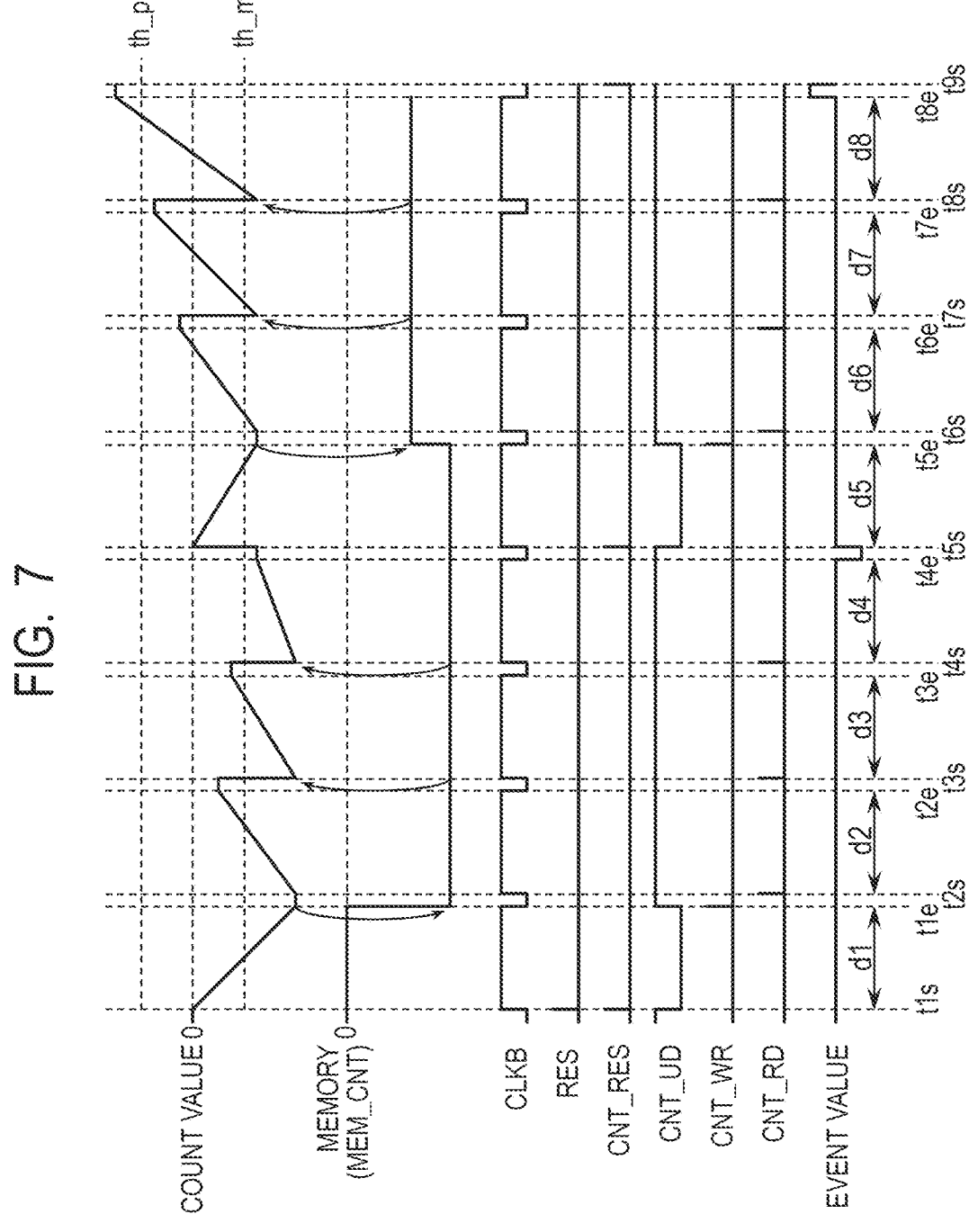
FIG. 7 is a timing chart illustrating the method of driving the photoelectric conversion device according to the first embodiment.

Next, a method of driving the photoelectric conversion device according to the present embodiment will be described with reference to FIG. 6 and FIG. 7. FIG. 6 is a flowchart illustrating a method of driving the photoelectric conversion device according to the present embodiment. FIG. 7 is a timing chart illustrating a method of driving the photoelectric conversion device according to the present embodiment. FIG. 7 illustrates a count value of the UD counter 32, a value stored in the memory 34, an event value which is an output of the determination unit 50, and waveforms of the signal CLKB, the reset signal RES, and the control signals CNT_RES, CNT_UD, CNT_WR, and CNT_RD.

First, the count value of the UD counter 32 is reset to zero (Step S101). At time t1s, when the reset signal RES is supplied from the control unit 70 to the count control unit 40, the count control unit 40 generates a control signal CNT_RES that is the same as the reset signal RES and supplies the control signal CNT_RES to the UD counter 32. The UD counter 32 resets the count value to zero with the control signal CNT_RES as a trigger.

It is assumed that the signal CLKB transitions from low-level to high-level at the time t1s. The count control unit 40 controls the control signal CNT_UD to low-level in response to a first rise of the signal CLKB after receiving the reset signal RES. The UD counter 32 starts down-counting in response to the low-level control signal CNT-UD and decreases the count value by one every time the pulse signal (photon detection signal) is output from the photoelectric conversion unit 20 (Step S102).

At the subsequent time t1e, when the signal CLKB transitions from high-level to low-level, the count control unit 40 controls the control signal CNT_UD from low-level to high-level. Then, the count control unit 40 outputs the control signal CNT_WR in response to the rise of the control signal CNT_UD. The memory 34 stores the count value of the UD counter 32 as the memory value MEM_CNT with the control signal CNT_WR as a trigger (Step S103).

It is assumed that the signal CLKB transitions from low-level to high-level at the subsequent time t2s. The count control unit 40 outputs the control signal CNT_RD in response to the rise of the signal CLKB when the control signal CNT_UD is at high-level. The UD counter 32 reads out the memory value MEM_CNT from the memory 34 with the control signal CNT_RD as a trigger and updates its own count value with the read out memory value MEM_CNT (Step S104). When the count value before the update is the same as the memory value MEM_CNT as in the case of the time t2s and time t6s in FIG. 7, this step may be omitted.

At the time t2s, the UD counter 32 starts up-counting in response to the high-level control signal CNT-UD and increases the count value by one every time the pulse signal (photon detection signal) is output from the photoelectric conversion unit 20 from the updated count value (Step S105). After the count period (period from the time t1s to the time t1e (period d1)) in which the down-counting is performed, the control signal CNT_UD is kept at high-level until an event is detected, and the UD counter 32 is set to perform up-counting. For example, while the down-counting is performed in the period d1, up-counting is performed in a period from the time t2s to time t2e (period d2). As a result, as the count value at the time t2e, a difference value between the count value in the period d2 and the count value in the period d1 is obtained.

When the signal CLKB transitions from high-level to low-level at the subsequent time t2e, the determination unit 50 performs the event determination process based on the count value received from the count unit 30 and the threshold values th_p and th_m (Step S106). The determination unit 50 outputs a determination result based on a result of comparison between the count value and the threshold values th_p and th_m to the count control unit 40 as an event value.

The count control unit 40 controls the UD counter 32 in accordance with the event value received from the determination unit 50. Specifically, when the event is not detected, that is, when the event value is 0 ("NO" in Step S107), the process returns to Step S104, and the count value of the UD counter 32 is updated by the memory value MEM_CNT read out from the memory 34. In the driving example of FIG. 7, the event value is 0 at the time t2e, and the memory value MEM_CNT is read out from the memory 34 at the subsequent time t3s. Further, the event value is 0 at the subsequent time t3e, and the memory value MEM_CNT is read out from the memory 34 at the subsequent time t4s. The operation in the period d3 from the time t3s to the time t3e and the operation in the period d4 from the time t4s to time t4e are the same as those in the period d2 from the time t2s to the time t2e.

When an event is detected, that is, when the event value is 1 or −1 ("YES" in Step S107), the process proceeds to Step S108. The count control unit 40 generates a control signal CNT_RES and supplies the control signal CNT_RES to the UD counter 32. The UD counter 32 resets the count value to zero with the control signal CNT_RES as a trigger. In the driving example of FIG. 7, since the count value is lower than the threshold value th_m at the time t4e, the event value is −1, and the count value of the UD counter 32 is reset to zero at the subsequent time t5s. After the UD counter 32 is reset, the process returns to Step S102. That is, after the time t5s, the same processing as that from the time t1s is performed.

At the subsequent time t5e, when the signal CLKB transitions from high-level to low-level, the count control unit 40 controls the control signal CNT_UD from low-level to high-level. Then, the count control unit 40 generates the control signal CNT_WR in response to the rise of the control signal CNT_UD. The memory 34 stores the count value of the UD counter 32 as the memory value MEM_CNT with the control signal CNT_WR as a trigger (Step S103).

It is assumed that the signal CLKB transitions from low-level to high-level at the subsequent time t6s. The count control unit 40 generates the control signal CNT_RD in response to the rise of the signal CLKB when the control signal CNT_UD is at high-level. The UD counter 32 reads out the memory value MEM_CNT from the memory 34 with the control signal CNT_RD as a trigger and updates its own count value with the read out memory value MEM_CNT (Step S104).

At the time t6s, the UD counter 32 starts up-counting in response to the high-level control signal CNT-UD and increases the count value by one every time the pulse signal (photon detection signal) is output from the photoelectric conversion unit 20 from the updated count value (Step S105). After the count period (period from the time t5s to the time t5e (period d5)) in which the down-counting is performed, the control signal CNT_UD is kept at high-level until an event is detected, and the UD counter 32 is set to perform up-counting. For example, while the down-counting is performed in the period d5, up-counting is performed in a period from the time t6s to time t6e (period d6). As a result, as the count value at the time t6e, a difference value between the count value in the period d6 and the count value in the period d5 is obtained.

When the signal CLKB transitions from high-level to low-level at the subsequent time t6e, the determination unit 50 performs the event determination process based on the count value received from the count unit 30 and the threshold values th_p and th_m (Step S106). The determination unit 50 outputs a determination result based on a result of comparison between the count value and the threshold values th_p and th_m to the count control unit 40 as an event value.

The count control unit 40 controls the UD counter 32 in accordance with the event value received from the determination unit 50. Specifically, when the event is not detected, that is, when the event value is 0 ("NO" in Step S107), the process returns to Step S104, and the count value of the UD counter 32 is updated by the memory value MEM_CNT read out from the memory 34. In the driving example of FIG. 7, the event value is 0 at the time t6e, and the memory value MEM_CNT is read out from the memory 34 at the subsequent time t7s. Further, the event value is 0 at the subsequent time t7e, and the memory value MEM_CNT is read out from the memory 34 at the subsequent time t8s. The operation in the period d7 from the time t7s to the time t7e and the operation in the period d8 from the time t8s to time t8e are the same as those in the period d2 from the time t2s to the time t2e.

When an event is detected, that is, when the event value is 1 or -1 ("YES" in Step S107), the process proceeds to Step S108. The count control unit 40 generates a control signal CNT_RES and supplies the control signal CNT_RES to the UD counter 32. The UD counter 32 resets the count value to zero with the control signal CNT_RES as a trigger. In the driving example of FIG. 7, since the count value exceeds the threshold value th_p at the time t8e, the event value is 1, and the count value of the UD counter 32 is reset to zero at the subsequent time t9s. After the UD counter 32 is reset, the process returns to Step S102. That is, after the time t9s, the same processing as that from the time t1s is performed.

As described above, in the present embodiment, since the difference value between the two exposure periods may be obtained as the count value by performing the up/down control of the counter, the number of subtractors for calculating the difference value may be reduced, and the configuration of the photoelectric conversion device may be simplified.

Therefore, according to the present embodiment, it is possible to realize a photoelectric conversion device capable of detecting high-resolution events while suppressing the circuit scale.

Second Embodiment

Figure 8:
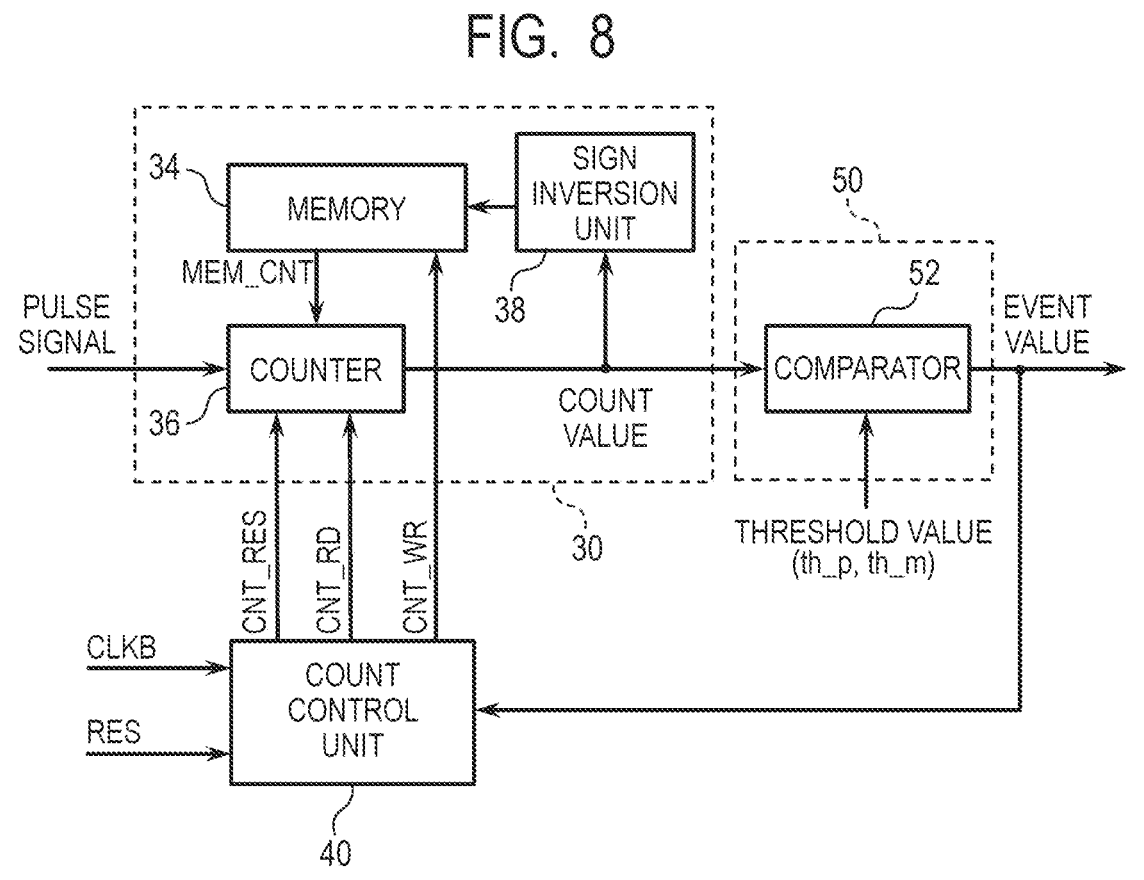
Figure 9:
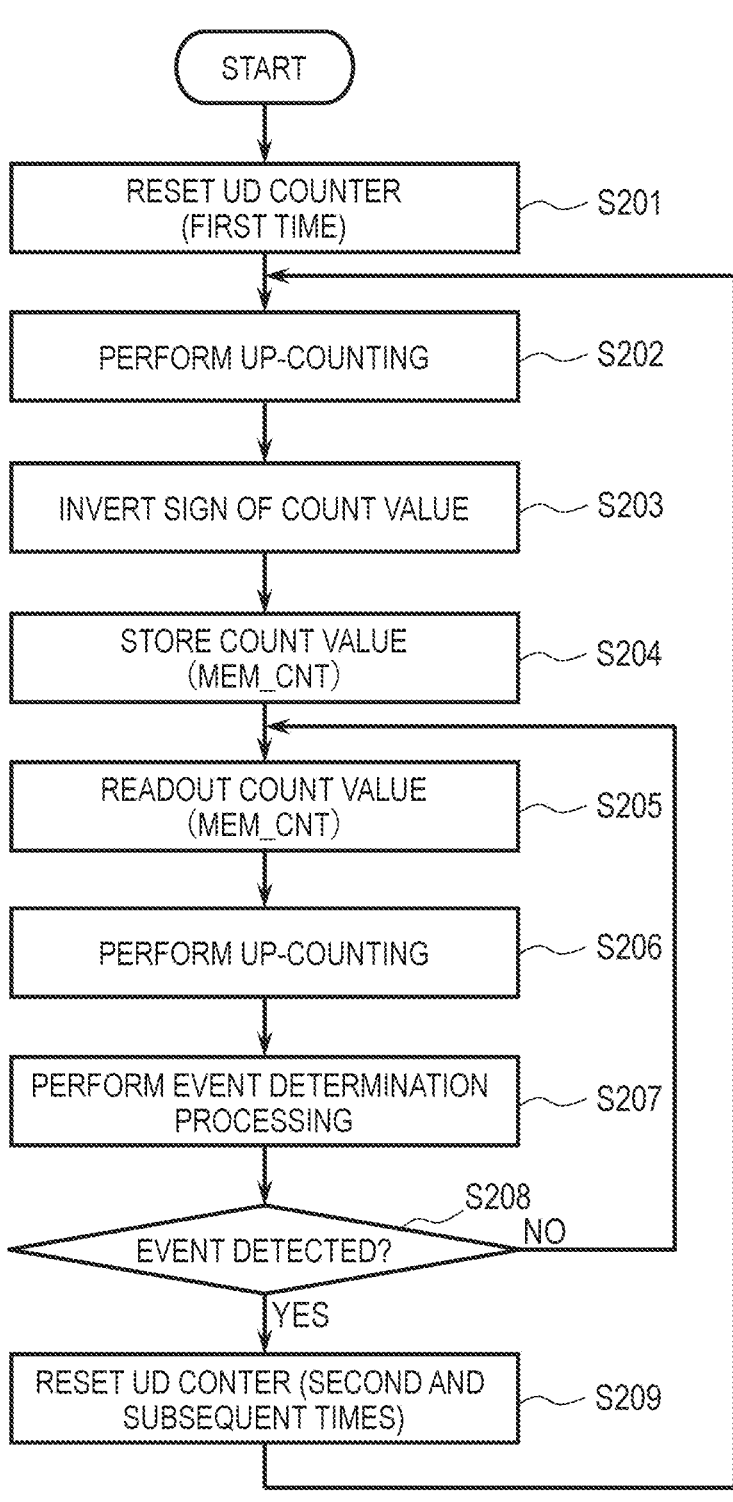
FIG. 9 is a flowchart illustrating a method of driving the photoelectric conversion device according to the second embodiment.
Figure 10:
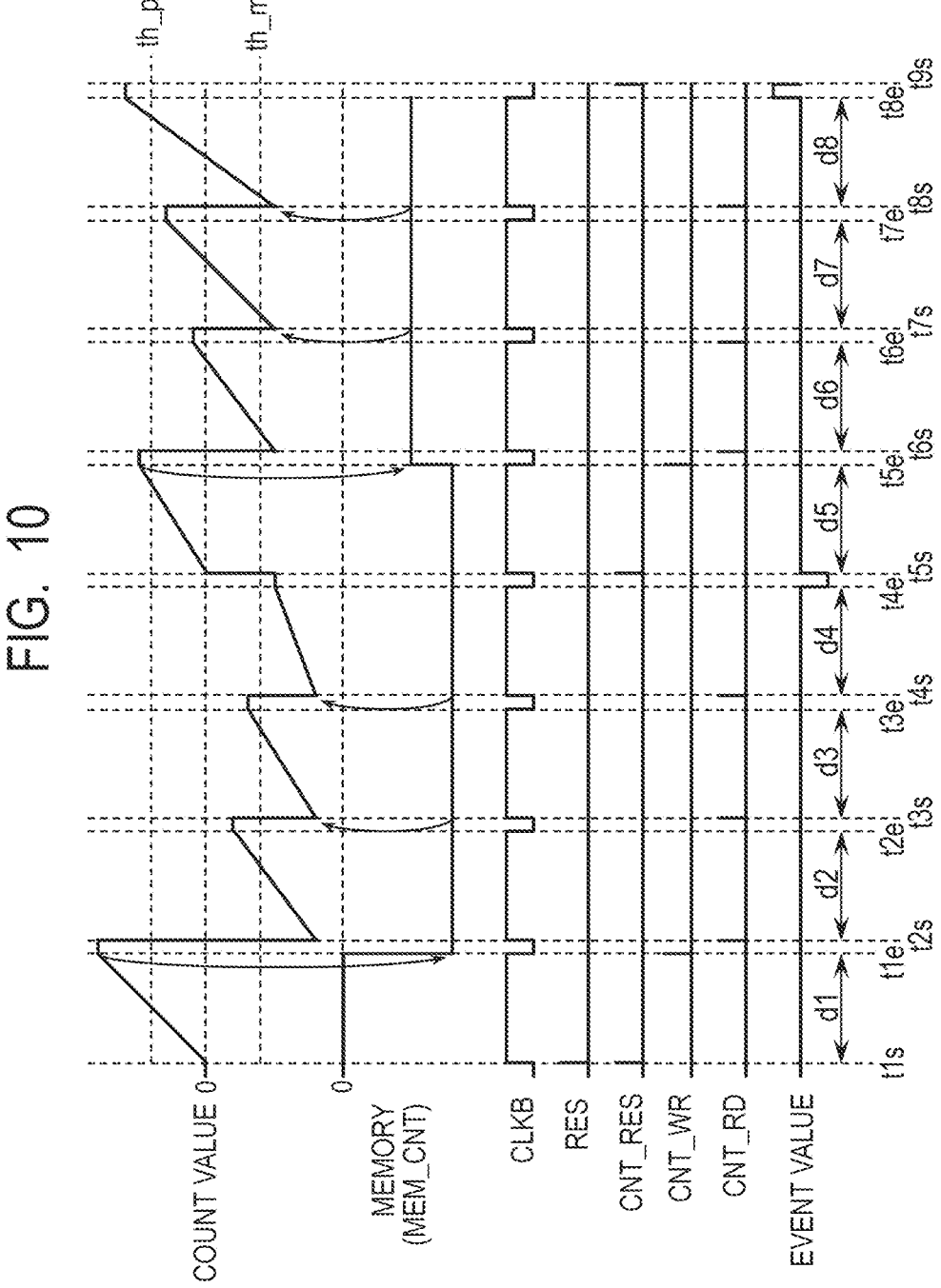
FIG. 10 is a timing chart illustrating the method of driving the photoelectric conversion device according to the second embodiment.

A photoelectric conversion device and a method of driving the same according to a second embodiment of the present disclosure will be described with reference to FIG. 8 to FIG. 10. FIG. 8 is a block diagram illustrating a configuration example of a count unit, a count control unit, and a determination unit of the photoelectric conversion device according to the present embodiment. FIG. 9 is a flowchart illustrating a method of driving the photoelectric conversion device according to the present embodiment. FIG. 10 is a timing chart illustrating a method of driving the photoelectric conversion device according to the present embodiment. The same components as those of the photoelectric conversion device according to the first embodiment are denoted by the same reference numerals, and description thereof will be omitted or simplified.

The photoelectric conversion device according to the present embodiment is the same as the photoelectric conversion device according to the first embodiment except that the configuration of the count unit 30 is different. In the present embodiment, differences from the photoelectric conversion device according to the first embodiment will be mainly described, and descriptions similar to those of the photoelectric conversion device according to the first embodiment will be appropriately omitted.

As illustrated in FIG. 8, the count unit 30 of the photoelectric conversion device according to the present embodiment includes a counter 36 capable of performing at least one of up-counting and down-counting, and a sign inversion unit 38 that inverts the sign of the count value output from the counter 36.

The count control unit 40 receives the signal CLKB and the reset signal RES from the control unit 70, and the event value that is an output signal of the determination unit 50, and generates control signals CNT_RES, CNT_WR, and CNT_RD. A pulse signal from the photoelectric conversion unit 20, the control signals CNT_RES and CNT_RD from the count control unit 40, and a memory value MEM_CNT from the memory 34 are input to the counter 36. A count value that is an output of the counter 36 is input to the sign determination unit. The control signal CNT_WR from the count control unit 40 and a count value to which a predetermined sign is assigned by the sign inversion unit 38 are input to the memory 34. The count value which is the output of the counter 36, a positive threshold value th_p, and a negative threshold value th_m are input to the comparator 52 of the determination unit 50.

Next, a method of driving the photoelectric conversion device according to the present embodiment will be described with reference to FIG. 9 and FIG. 10. FIG. 10 illustrates a count value of the counter 36, a value stored in the memory 34, an event value which is an output of the determination unit 50, and waveforms of the signal CLKB, the reset signal RES, and the control signals CNT_RES, CNT_WR, and CNT_RD.

First, the count value of the counter 36 is reset to zero (Step S201). At time t1s, when the reset signal RES is supplied from the control unit 70 to the count control unit 40, the count control unit 40 generates a control signal CNT_RES that is the same as the reset signal RES and supplies the control signal CNT_RES to the counter 36. The counter 36 resets the count value to zero with the control signal CNT_RES as a trigger.

It is assumed that, at the time t1s, the signal CLKB transitions from low-level to high-level, and the exposure period starts. The counter 36 starts up-counting and increases the count value by one every time the pulse signal (photon detection signal) is output from the photoelectric conversion unit 20 (Step S202).

At the subsequent time t1e, the count control unit 40 outputs the control signal CNT_WR in response to the falling edge (negative edge) of the signal CLKB. In addition, the sign inversion unit 38 inverts a sign of a count value which is an output of the counter 36, and outputs the inverted value to the memory 34. Using the control signal CNT_WR as a trigger, the memory 34 stores the count value inverted by the sign inversion unit 38 as the memory value MEM_CNT (Step S204). In the sign inversion of the count value in the sign inversion unit 38, the count value may be converted into ones' complement, or the count value may be converted into two's complement. The former may be implemented by simple bit inversion, but the latter requires an adder. When the inverted output is obtained from the counter 36, the inverted output of the counter 36 may be directly supplied to the memory 34 without using the sign inversion unit 38.

At the subsequent time t2s, the count control unit 40 outputs the control signal CNT_RD in response to the rise of the signal CLKB. The counter 36 reads out the memory value MEM_CNT from the memory 34 with the control signal CNT_RD as a trigger and updates its own count value with the read out memory value MEM_CNT (Step S205).

At the time t2s, the counter 36 starts up-counting in response to the rise of the signal CLKB and increases the count value by one every time the pulse signal (photon detection signal) is output from the photoelectric conversion unit 20 from the updated count value (Step S206). The up-counting in the period d2 is performed from the count value obtained by inverting the sign of the count value in the period d1. As a result, a difference value between the count value in the period d2 and the count value in the period d1 is obtained as the count value at time t2e.

When the signal CLKB transitions from high-level to low-level at the subsequent time t2e, the determination unit 50 performs the event determination process based on the count value received from the count unit 30 and the threshold values th_p and th_m (Step S207). The determination unit 50 outputs a determination result based on a result of comparison between the count value and the threshold values th_p and th_m to the count control unit 40 as an event value.

The count control unit 40 controls the counter 36 in accordance with the event value received from the determination unit 50. Specifically, when the event is not detected, that is, when the event value is 0 ("NO" in Step S208), the process returns to Step S205, and the count value of the counter 36 is updated by the memory value MEM_CNT read out from the memory 34. In the driving example of FIG. 10, the event value is 0 at the time t2e, so that the memory value MEM_CNT is read out from the memory 34 at the subsequent time t3s. Further, the event value is 0 at the subsequent time t3e, so that the memory value MEM_CNT is read out from the memory 34 at the subsequent time t4s. The operation in the period d3 from the time t3s to the time t3e and the operation in the period d4 from the time t4s to time t4e are the same as those in the period d2 from the time t2s to the time t2e.

When an event is detected, that is, when the event value is 1 or -1 ("YES" in Step S208), the process proceeds to Step S209. The count control unit 40 generates a control signal CNT_RES and supplies the control signal CNT_RES to the counter 36. The counter 36 resets the count value to zero with the control signal CNT_RES as a trigger. In the driving example of FIG. 10, since the count value is lower than the threshold value th_m at the time t4e, the event value is −1, and the count value of the counter 36 is reset to zero at the subsequent time t5s. After the counter 36 is reset, the process returns to Step S202. That is, after the time t5s, the same processing as that from the time t1s is performed.

At the subsequent time t5e, the count control unit 40 generates the control signal CNT_WR in accordance with the fall of the signal CLKB. In addition, the sign inversion unit 38 inverts the sign of the count value which is the output of the counter 36, and outputs the inverted value to the memory 34. The memory 34 stores the count value inverted by the sign inversion unit 38 as the memory value MEM_CNT with the control signal CNT_WR at high-level as a trigger (Step S204).

At the subsequent time t6s, the count control unit 40 generates the control signal CNT_RD in response to the rise of the signal CLKB. The counter 36 reads out the memory value MEM_CNT from the memory 34 with the control signal CNT_RD as a trigger and updates its own count value with the read out memory value MEM_CNT (Step S205).

At the time t6s, the counter 36 starts the up-counting in response to the rise of the signal CLKB and increases the count value by one every time the pulse signal (photon detection signal) is output from the photoelectric conversion unit 20 from the updated count value (Step S206). The up-counting in the period d6 is performed from the count value obtained by inverting the sign of the count value in the period d5. As a result, a difference value between the count value in the period d6 and the count value in the period d5 is obtained as the count value at time t6e.

When the signal CLKB transitions from high-level to low-level at the subsequent time t6e, the determination unit 50 performs the event determination process based on the count value received from the count unit 30 and the threshold values th_p and th_m (Step S207). The determination unit 50 outputs a determination result based on a result of comparison between the count value and the threshold values th_p and th_m to the count control unit 40 as an event value.

The count control unit 40 controls the counter 36 in accordance with the event value received from the determination unit 50. Specifically, when the event is not detected, that is, when the event value is 0 ("NO" in Step S208), the process returns to Step S205, and the count value of the counter 36 is updated by the memory value MEM_CNT read out from the memory 34. In the driving example of FIG. 10, the event value is 0 at the time t6e, and the memory value MEM_CNT is read out from the memory 34 at subsequent time t7s. Further, the event value is 0 at the subsequent time t7e, and the memory value MEM_CNT is read out from the memory 34 at the subsequent time t8s. The operation in the period d7 from the time t7s to the time t7e and the operation in the period d8 from the time t8s to time t8e are the same as those in the period d2 from the time t2s to the time t2e.

When an event is detected, that is, when the event value is 1 or -1 ("YES" in Step S208), the process proceeds to Step S209. The count control unit 40 generates a high-level control signal CNT_RES and supplies the control signal CNT_RES to the counter 36. The counter 36 resets the count value to zero with the control signal CNT_RES at high-level as a trigger. In the driving example of FIG. 10, since the count value exceeds the threshold value th_p at the time t8e, the event value is 1, and the count value of the counter 36 is reset to zero at the subsequent time t9s. After the counter 36 is reset, the process returns to Step S202. That is, after the time t9s, the same processing as that from the time t1s is performed.

As described above, in the present embodiment, since the difference value between the two exposure periods may be obtained as the count value by performing the sign inversion processing of the count value of the counter, the number of subtractors for calculating the difference value may be reduced, and the configuration of the photoelectric conversion device may be simplified.

Therefore, according to the present embodiment, it is possible to realize a photoelectric conversion device capable of detecting high-resolution events while suppressing the circuit scale.

Third Embodiment

Figure 11:
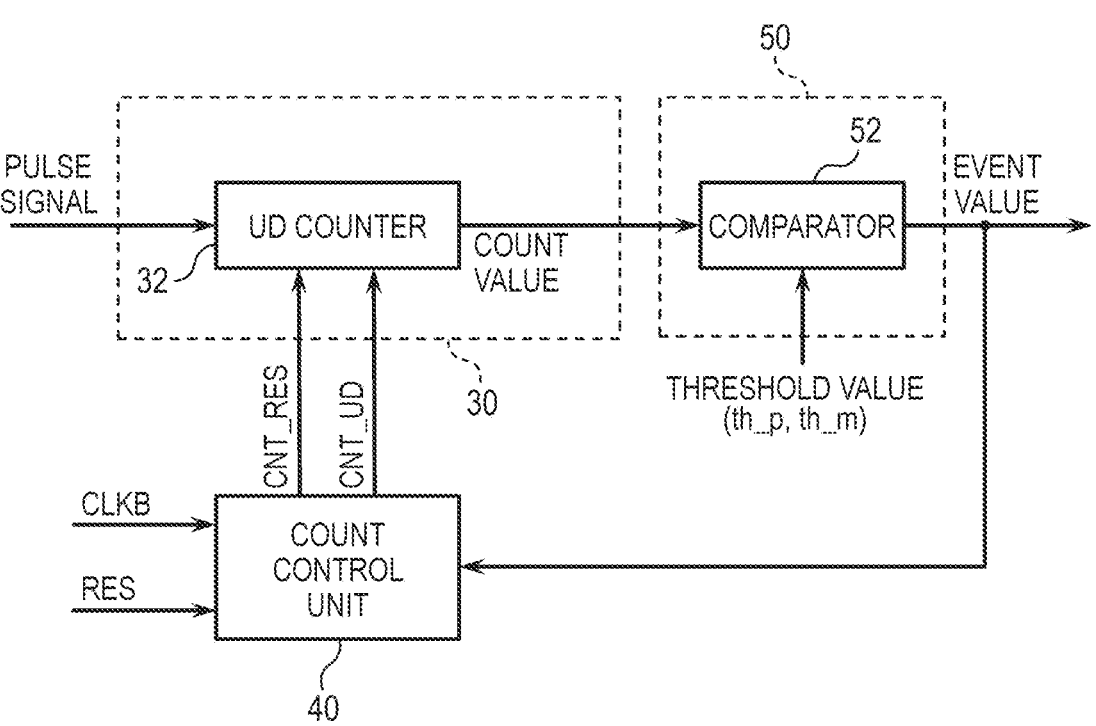
FIG. 11 is a block diagram illustrating a configuration example of a count unit, a count control unit, and a determination unit of a photoelectric conversion device according to a third embodiment.
Figure 12:
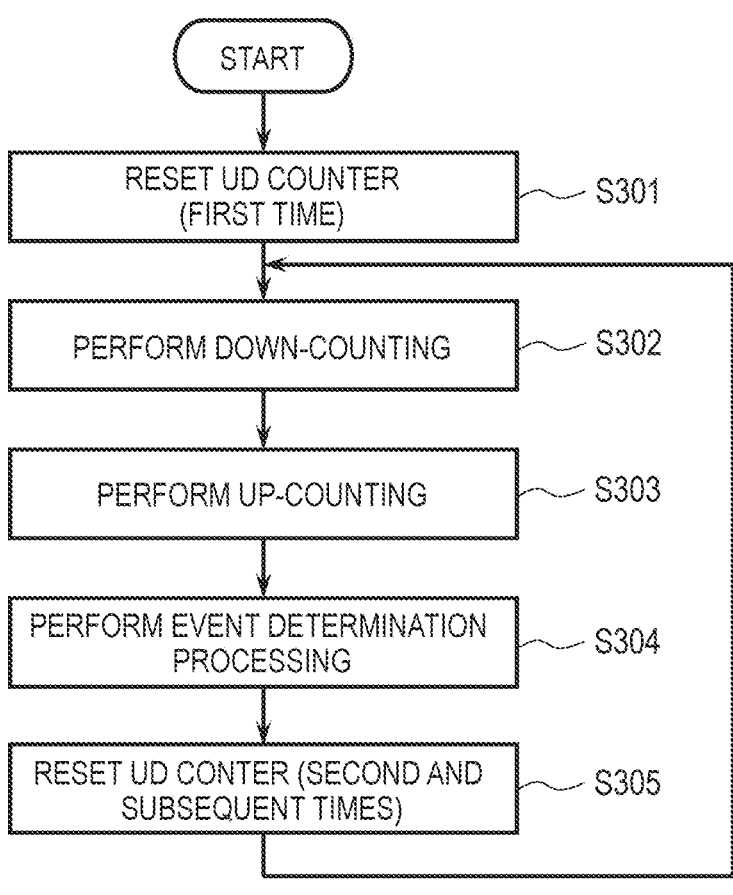
FIG. 12 is a flowchart illustrating a method of driving the photoelectric conversion device according to the third embodiment.
Figure 13:
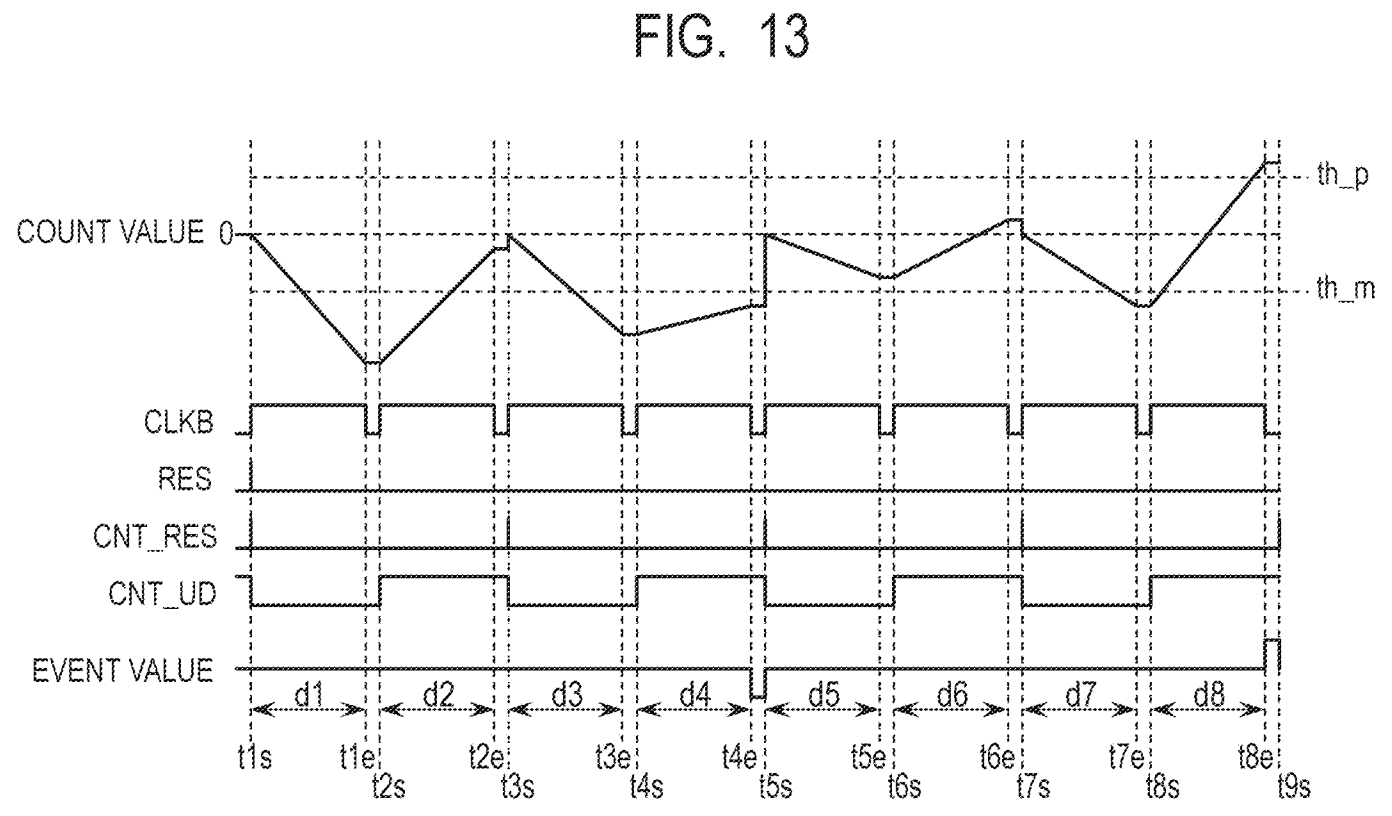
Figure 14:
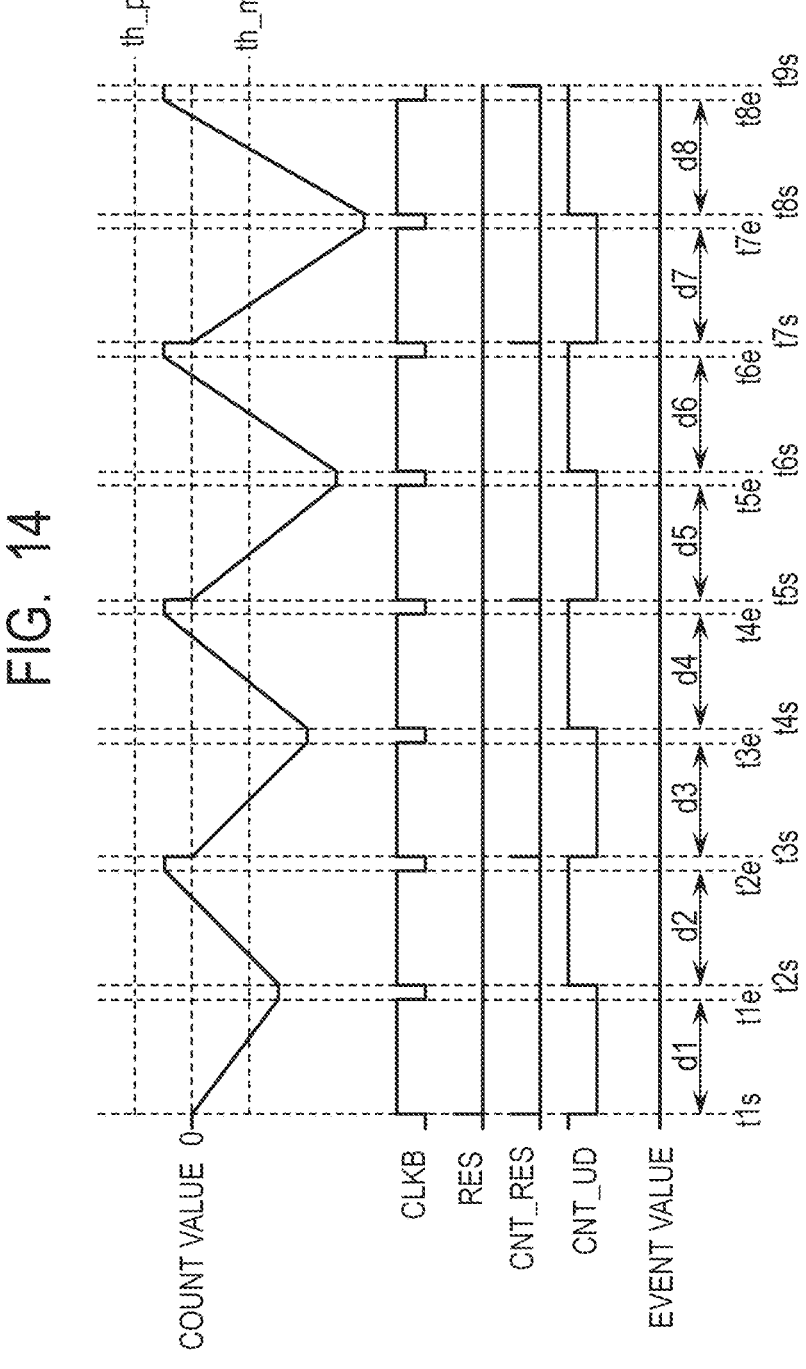

A photoelectric conversion device and a method of driving the same according to a third embodiment of the present disclosure will be described with reference to FIG. 11 to FIG. 14. FIG. 11 is a block diagram illustrating a configuration example of a count unit, a count control unit, and a determination unit of the photoelectric conversion device according to the present embodiment. FIG. 12 is a flowchart illustrating a method of driving the photoelectric conversion device according to the present embodiment. FIG. 13 and FIG. 14 are timing charts illustrating a method of driving the photoelectric conversion device according to the present embodiment. The same components as those of the photoelectric conversion device according to the first or second embodiment are denoted by the same reference numerals, and description thereof will be omitted or simplified.

The photoelectric conversion device according to the present embodiment is the same as the photoelectric conversion device according to the first embodiment except that the configuration of the count unit 30 is different. In the present embodiment, differences from the photoelectric conversion device according to the first embodiment will be mainly described, and descriptions similar to those of the photoelectric conversion device according to the first embodiment will be appropriately omitted.

As illustrated in FIG. 11, the count unit 30 of the photoelectric conversion device according to the present embodiment is configured by a UD counter 32 capable of performing both up-counting and down-counting. The count unit 30 according to the present embodiment does not include the memory 34 that is included in the count units 30 according to the first and second embodiments.

The count control unit 40 receives the signal CLKB and the reset signal RES from the control unit 70, and an event value that is an output signal of the determination unit 50, and generates control signals CNT_RES and CNT_UD. A pulse signal from the photoelectric conversion unit 20 and control signals CNT_RES and CNT_UD from the count control unit 40 are input to the UD counter 32. A count value which is an output of the UD counter 32, a positive threshold value th_p, and a negative threshold value th_m are input to the comparator 52 of the determination unit 50.

In FIG. 11, the event value that is the output signal of the determination unit 50 is fed back to the count control unit 40, but the feedback of the event value is not always necessary when only the driving method described in the present embodiment is performed. The configuration example illustrated in FIG. 11 takes into consideration a case where the driving method of the fourth embodiment described later is also implemented.

Next, a method of driving the photoelectric conversion device according to the present embodiment will be described with reference to FIG. 12 to FIG. 14. FIG. 13 and FIG. 14 illustrate the count value of the counter 36, the event value that is the output of the determination unit 50, and the waveforms of the signal CLKB, the reset signal RES, and the control signals CNT_RES and CNT_UD.

First, when the reset signal RES is supplied from the control unit 70 to the count control unit 40 at time t1*s*, the count control unit 40 generates a control signal CNT_RES that is the same as the reset signal RES and supplies the control signal CNT_RES to the UD counter 32. The UD counter 32 resets the count value to zero with the control signal CNT_RES as a trigger (Step S301).

At the time t1*s*, the count control unit 40 controls the control signal CNT_UD to low-level in response to a first rise of the signal CLKB after receiving the reset signal RES. The UD counter 32 starts down-counting in response to the low-level control signal CNT_UD and decreases the count value by one every time the pulse signal (photon detection signal) is output from the photoelectric conversion unit 20 (Step S302). The down-counting in the UD counter 32 continues until time t1*e* when the signal CLKB next transitions from high-level to low-level.

When the signal CLKB transitions from low-level to high-level again at the subsequent time t2*s*, the count control unit 40 controls the control signal CNT_UD from low-level to high-level in accordance with the rise of the signal CLKB. The UD counter 32 starts up-counting in response to the high-level control signal CNT_UD and increases the count value by one every time the pulse signal (photon detection signal) is output from the photoelectric conversion unit 20 (Step S303). The up-counting in the UD counter 32 starts from the count value at the time t1*e*, and continues until time t2*e* when the signal CLKB transitions from high-level to low-level. As a result, as the count value at the time t2*e*, a difference value between the count value in the period d2 and the count value in the period d1 is obtained.

When the signal CLKB transitions from high-level to low-level at the subsequent time t2*e*, the determination unit 50 performs the event determination process based on the count value received from the count unit 30 and the threshold values th_p and th_m (Step S304). The event determination result is output from the determination unit 50 as an event value.

At the subsequent time t3*s*, the count control unit 40 generates the control signal CNT_RES and supplies the control signal CNT_RES to the UD counter 32. The UD counter 32 resets the count value to 0 with the control signal CNT_RES as a trigger (Step S305). Thereafter, the process returns to Step S302, and the process from Step S302 to Step S305 are repeated in the same manner as the process from the time t1*s* to the time t2*e*.

As described above, in the present embodiment, the count control unit 40 performs the toggle operation of switching the signal level of the control signal CNT_UD every time the rising edge of the signal CLKB is detected. That is, the count control unit 40 controls the UD counter to perform down-counting in the periods d1, d3, d5, d7, d9, . . . which are odd-numbered exposure periods. Further, the UD counter 32 is controlled to perform up-counting in the periods d2, d4, d6, d8, . . . which are even-numbered exposure periods. Before the periods d1, d3, d5, d7, d9, . . . which are the odd-numbered exposure periods, the count control unit 40 generates the control signal CNT_RES and resets the count value of the UD counter 32 to zero with the control signal CNT_RES as a trigger. After the periods d2, d4, d6, d8, . . . which are the even-numbered exposure periods have elapsed, the event determination process in the determination unit 50 is performed.

The output of the event value according to the result of the event determination process is the same as in the first embodiment. That is, in the event determination, when the count value is equal to or larger than the threshold value th_m and equal to or smaller than the threshold value th_p, the event value 0 is output as the event non-detection. When the count value is less than the threshold value th_m, the event value −1 is output as the event detection. When the count value exceeds the threshold value th_p, the event value 1 is output as the event detection.

As described above, in the present embodiment, the down-counting and the up-counting are always repeated regardless of the occurrence or non-occurrence of the event, so that the difference value between the two exposure periods may be obtained as the count value. Although the event detection frequency is lower than that of the first embodiment, the memory for storing the count value may be reduced in addition to the subtractor for calculating the difference value. On the other hand, in the present embodiment, the event detection is performed by acquiring the difference value between the count values in two consecutive exposure periods. Thus, for example, when a constant luminance change equal to or less than the event detection threshold value continues as in the timing chart illustrated in FIG. 14, the event detection is not performed.

Therefore, according to the present embodiment, it is possible to realize a photoelectric conversion device capable of detecting high-resolution events while suppressing the circuit scale.

Fourth Embodiment

A photoelectric conversion device and a method of driving the same according to a fourth embodiment of the present disclosure will be described with reference to FIG. 15 and FIG. 16. The same components as those of the photoelectric conversion devices according to the first to third embodiments are denoted by the same reference numerals, and description thereof will be omitted or simplified.

In the present embodiment, a method of improving an operation in which event detection is not performed when a constant luminance change equal to or less than an event detection threshold value continues in the photoelectric conversion device according to the third embodiment will be described. The configuration of the count unit, the count control unit, and the determination unit in the photoelectric conversion device according to the present embodiment is the same as the configuration example of the third embodiment described with reference to FIG. 11.

Figure 15:
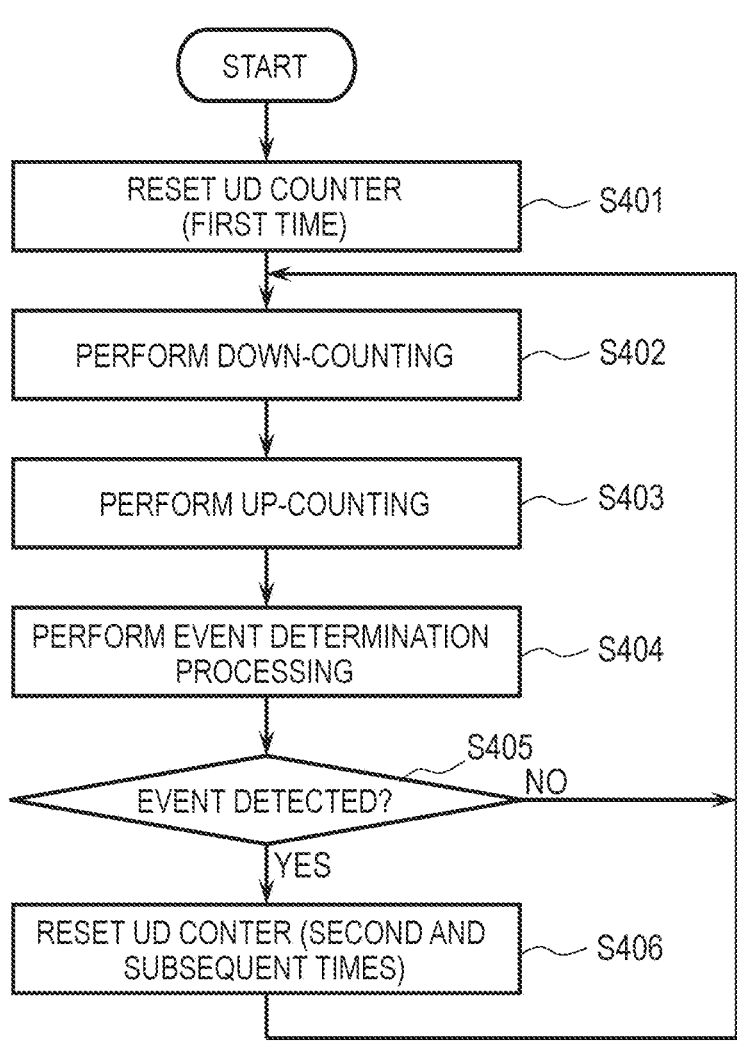
FIG. 15 is a flowchart illustrating a method of driving a photoelectric conversion device according to a fourth embodiment.

FIG. 15 is a flowchart illustrating a method of driving the photoelectric conversion device according to the present embodiment. FIG. 16 is a timing chart illustrating a method of driving the photoelectric conversion device according to the present embodiment. FIG. 16 illustrates a count value of the counter 36, an event value which is an output of the determination unit 50, and waveforms of the signal CLKB, the reset signal RES, and the control signals CNT_RES and CNT_UD.

First, when the reset signal RES is supplied from the control unit 70 to the count control unit 40 at time t1s, the count control unit 40 generates the control signal CNT_RES that is the same as the reset signal RES and supplies the control signal CNT_RES to the UD counter 32. The UD counter 32 resets the count value to zero with the control signal CNT_RES as a trigger (Step S401).

At the time t1s, the count control unit 40 controls the control signal CNT_UD to low-level in response to a first rise of the signal CLKB after receiving the reset signal RES. The UD counter 32 starts down-counting in response to the low-level control signal CNT_UD and decreases the count value by one every time the pulse signal (photon detection signal) is output from the photoelectric conversion unit 20 (Step S402). The down-counting in the UD counter 32 continues until time t1e when the signal CLKB transitions from high-level to low-level next.

When the signal CLKB transitions from low-level to high-level again at the subsequent time t2s, the count control unit 40 controls the control signal CNT_UD from low-level to high-level in accordance with the rise of the signal CLKB. The UD counter 32 starts up-counting in response to the high-level control signal CNT_UD and increases the count value by one every time the pulse signal (photon detection signal) is output from the photoelectric conversion unit 20 (Step S403). The up-counting in the UD counter 32 starts from the count value at the time t1e, and continues until time t2e when the signal CLKB transitions from high-level to low-level next. As a result, as the count value at the time t2e, a difference value between the count value in the period d2 and the count value in the period d1 is obtained.

When the signal CLKB transitions from high-level to low-level at the subsequent time t2e, the determination unit 50 performs the event determination process based on the count value received from the count unit 30 and the threshold values th_p and th_m (Step S404). The event determination result is output from the determination unit 50 as an event value.

Also in the present embodiment, as in the third embodiment, the count control unit 40 performs the toggle operation of switching the signal level of the control signal CNT_UD every time the rising edge of the signal CLKB is detected. That is, the count control unit 40 controls the UD counter to perform down-counting in the periods d1, d3, d5, d7, d9, . . . which are odd-numbered exposure periods. Further, the UD counter 32 is controlled to perform up-counting in the periods d2, d4, d6, d8, . . . which are even-numbered exposure periods. After the periods d2, d4, d6, d8, . . . which are the even-numbered exposure periods have elapsed, the event determination process in the determination unit 50 is performed.

In the present embodiment, after the event determination processing in the determination unit 50, the count value of the UD counter 32 is set according to the result of the event determination processing. Specifically, when an event is not detected, that is, when the event value is 0 ("NO" in Step S405), the process returns to Step S402 without resetting the count value of the UD counter 32 and proceeds to the next exposure period. When an event is detected, that is, when the event value is 1 or −1 ("YES" in Step S405), the process proceeds to Step S406. The count control unit 40 generates the control signal CNT_RES and supplies the control signal CNT_RES to the UD counter 32. The UD counter 32 resets the count value to zero with the control signal CNT_RES as a trigger. After that, the process returns to Step 402 and proceeds to the next exposure period.

Figure 16:
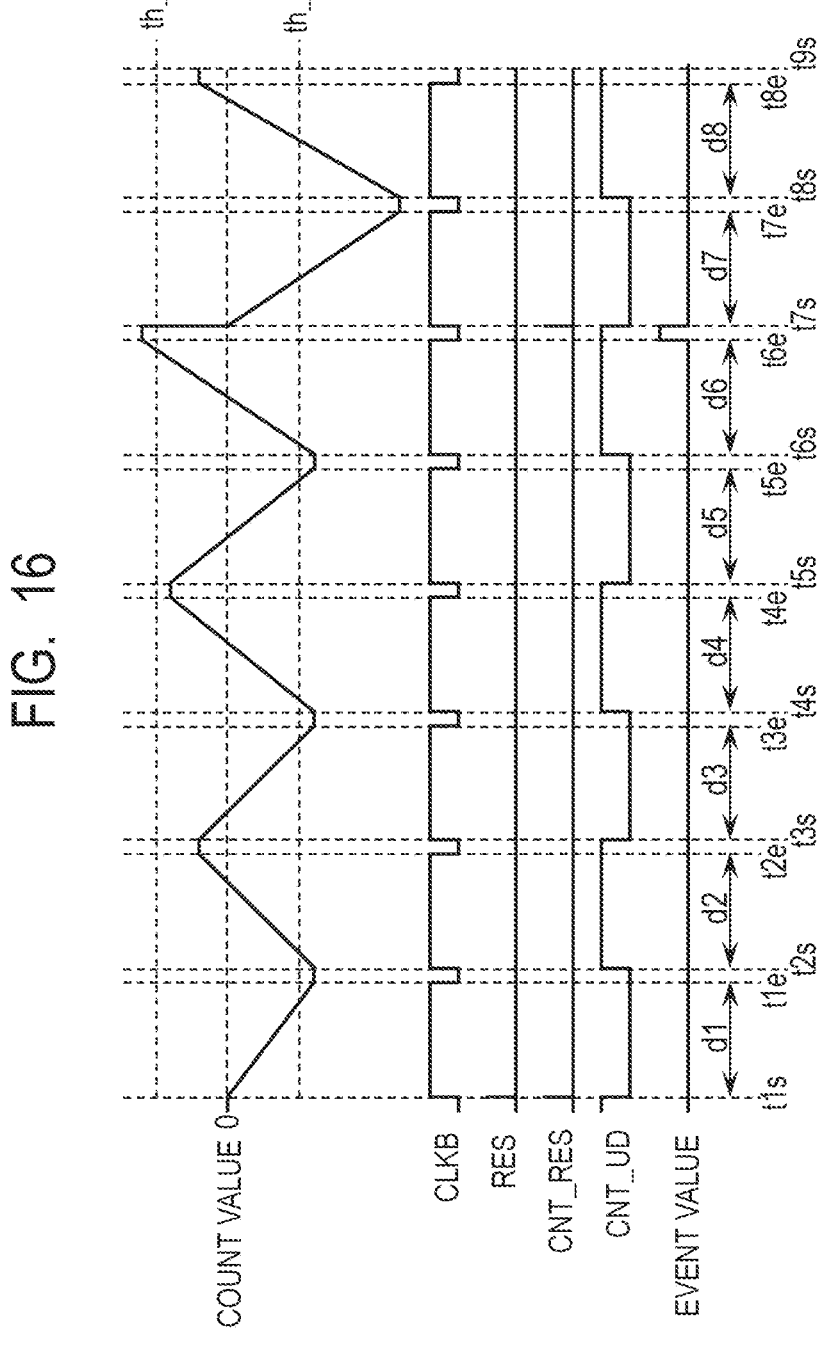
FIG. 16 is a timing chart illustrating the method of driving the photoelectric conversion device according to the fourth embodiment.

For example, in the driving example of FIG. 16, the event value in the event determination processing after each of the time t2e, the time t4e, and the time t8e is 0. Therefore, in the exposure periods of the periods d3, d5, and d9, the count operation is started from the count value in the immediately preceding exposure period. On the other hand, the event value in the event determination process after the time t6e is 1. Therefore, in the exposure period of the period d7, the count operation is started from zero after the count value of the period d6 is reset.

That is, in the present embodiment, when no event occurs, the count operation of the next two exposure periods is continuously performed without resetting the current count value, that is, the difference value between the count values in the previous exposure periods. Therefore, since the difference value may be accumulated when no event occurs, the event may be detected even when a constant luminance change equal to or less than the event detection threshold value continues.

As described above, in the present embodiment, the down-counting and the up-counting are always repeated regardless of the occurrence or non-occurrence of the event, so that the difference value between the two exposure periods may be obtained as the count value. Although the event detection frequency is lower than that of the first embodiment, it is possible to reduce the memory for storing the count value in addition to the subtractor for calculating the difference value. In addition, even in a case where a constant luminance change equal to or less than the event detection threshold value continues, which is a problem in the third embodiment, it is possible to detect an event.

Therefore, according to the present embodiment, it is possible to realize a photoelectric conversion device capable of detecting high-resolution events while suppressing the circuit scale.

Fifth Embodiment

Figure 17:
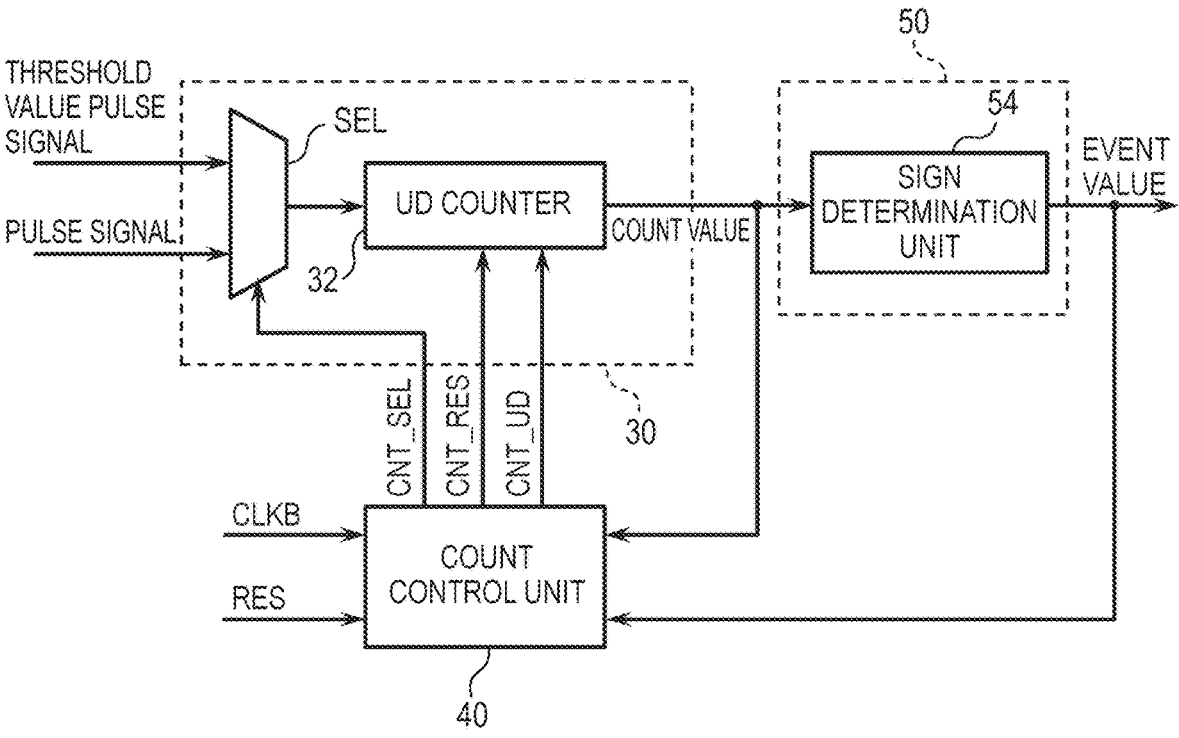
FIG. 17 is a block diagram illustrating a configuration example of a count unit, a count control unit, and a determination unit of a photoelectric conversion device according to a fifth embodiment.
Figure 18:
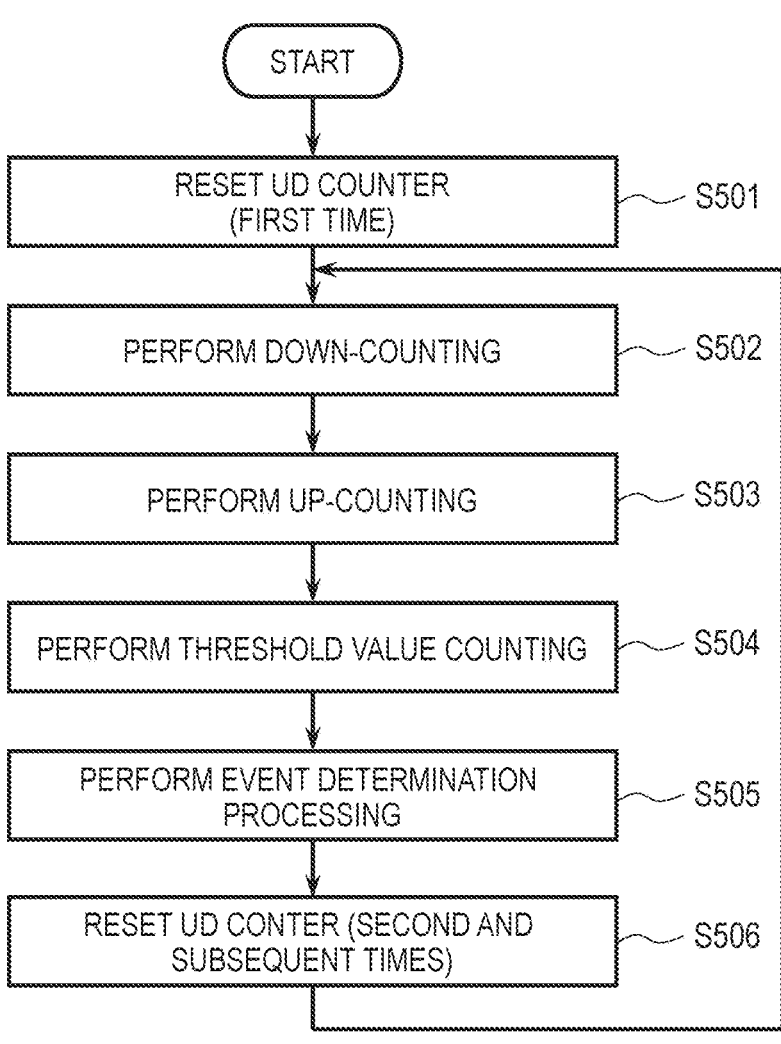
FIG. 18 is a flowchart illustrating a method of driving the photoelectric conversion device according to the fifth embodiment.
Figure 19:
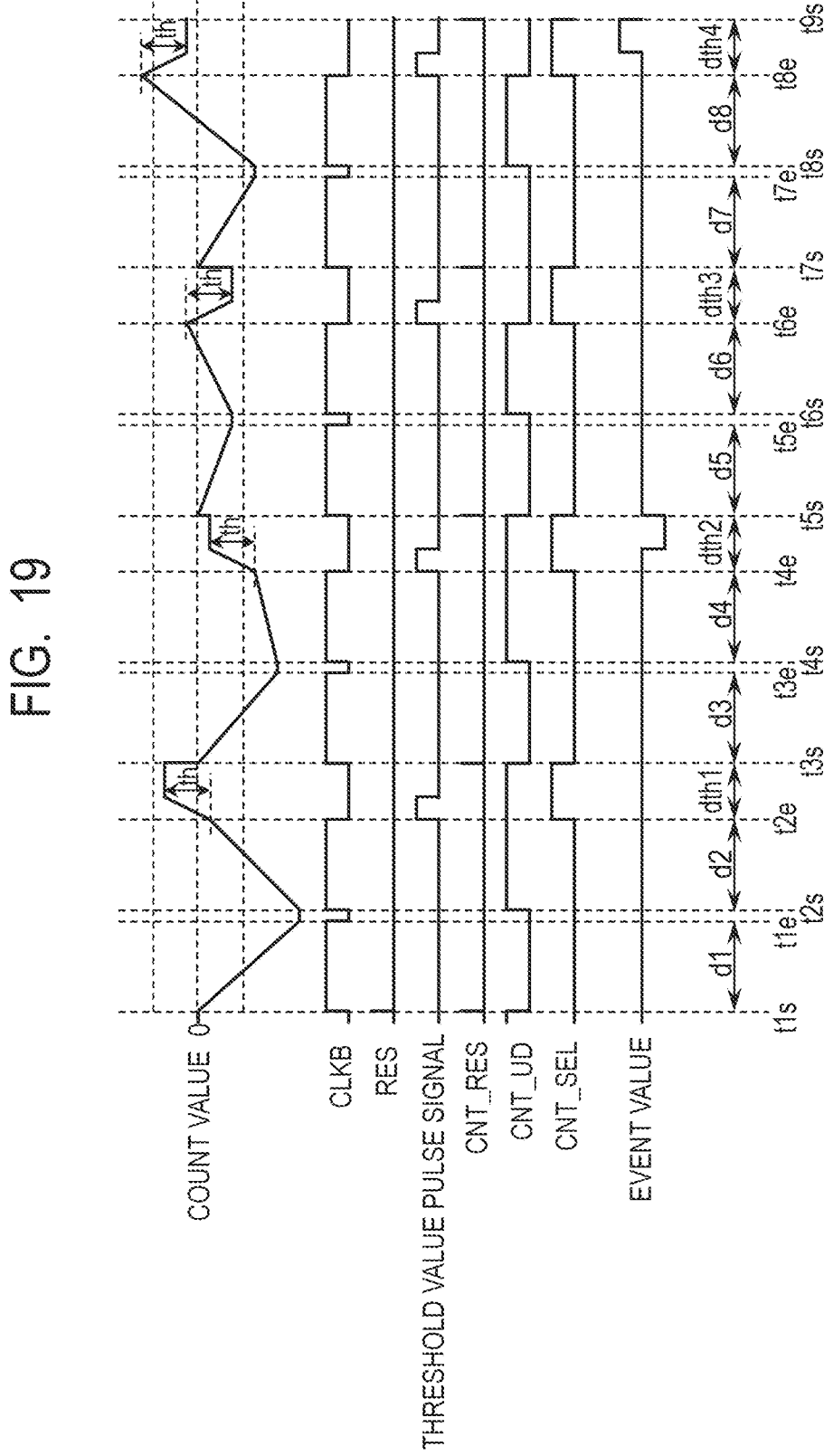
FIG. 19 is a timing chart illustrating the method of driving the photoelectric conversion device according to the fifth embodiment.

A photoelectric conversion device and a method of driving the same according to a fifth embodiment of the present disclosure will be described with reference to FIG. 17 to FIG. 19. FIG. 17 is a block diagram illustrating a configuration example of a count unit, a count control unit, and a determination unit of the photoelectric conversion device according to the present embodiment. FIG. 18 is a flowchart illustrating a method of driving the photoelectric conversion device according to the present embodiment. FIG. 19 is a timing chart illustrating a method of driving the photoelectric conversion device according to the present embodiment. The same components as those of the photoelectric conversion devices according to the first to fourth embodiments are denoted by the same reference numerals, and description thereof will be omitted or simplified.

The photoelectric conversion device according to the present embodiment is the same as the photoelectric conversion device according to the first embodiment except that the configurations of the count unit 30 and the determination unit 50 are different. In the present embodiment, differences from the photoelectric conversion device according to the first embodiment will be mainly described, and descriptions similar to those of the photoelectric conversion device according to the first embodiment will be appropriately omitted.

In the count unit 30 of the photoelectric conversion device according to the present embodiment, as illustrated in FIG. 17, the count unit 30 includes a selector SEL and the UD counter 32, and the determination unit 50 includes a sign determination unit 54.

The count control unit 40 receives a signal CLKB and a reset signal RES from the control unit 70, a count value which is an output signal of the UD counter 32, and an event value which is an output signal of the determination unit 50, and generates control signals CNT_SEL, CNT_RES, and CNT_UD. Here, the control signal CNT_SEL is a signal for switching the output signal from the selector SEL. For example, the selector SEL selects and outputs a pulse signal from the photoelectric conversion unit 20 when the control signal CNT_SEL is at low-level and selects and outputs a pulse signal (threshold value pulse signal) whose number corresponds to a predetermined threshold value th when the control signal CNT_SEL is at high-level. An output signal of the selector SEL and the control signals CNT_RES and CNT_UD from the count control unit 40 are input to the UD counter 32.

The event value that is the output signal of the determination unit 50 is generated based on the determination result of the sign determination unit 54. That is, the sign determination unit 54 determines whether or not an event has occurred based on the relationship between the sign of the count value that is the output signal from the count unit 30 and the sign of the count value after adding or subtracting a predetermined threshold value. For example, the event value may be defined by the following Expression (2).

$$\text{Event Value} = \begin{cases} 1 & (\text{Count Value (positive)} - th > 0) \\ -1 & (\text{Count Value (negative)} + th < 0) \\ 0 & (\text{Other Than The Above}) \end{cases} \quad (2)$$

When the count value which is the output signal from the count unit 30 is a positive value, a predetermined threshold value th is subtracted from the count value (−th is added). When the count value after subtraction (added value) is a positive value, that is, when the count value which is the output signal from the count unit 30 is larger than the threshold value th, it is determined that the event is an on-event, and the event value 1 is output. When the count value which is the output signal from the count unit 30 is a negative value, a predetermined threshold value th is added to the count value. When the count value after the addition (addition value) is a negative value, that is, when the absolute value of the count value which is the output signal from the count unit 30 is larger than the threshold value th, it is determined that the event is an off-event, and the event value −1 is output. In other cases, that is, when a sign of the count value obtained by adding the count value corresponding to the threshold value th (added value) is inverted from a sign of the count value which is the output signal from the count unit 30, it is determined that no event occurs, and the event value 0 is output. The determination of the sign of the count value may be realized by a small-scale circuit because it is only necessary to monitor the sign bit (one bit).

In the first to fourth embodiments, since the comparator is used for event determination, a subtraction circuit, a flip-flop for data retention, a signal line for supplying threshold value data, and the like are required, and there is a concern that the circuit scale and the interconnection area increase. In contrast, in the present embodiment, since the comparator is not used in the event determination processing, it is possible to simplify the processing circuit of the determination unit 50 and reduce the circuit scale.

Next, a method of driving the photoelectric conversion device according to the present embodiment will be described with reference to FIG. 18 and FIG. 19. FIG. 19 illustrates the count value of the UD counter 32, the event value that is the output of the determination unit 50, and the waveforms of the signal CLKB, the reset signal RES, the threshold value pulse signal, and the control signals CNT_RES, CNT_UD, and CNT_SEL.

In the driving method of the present embodiment, as in the third and fourth embodiments, the count control unit 40 performs a toggle operation of switching the signal level of the control signal CNT_UD every time the rising edge of the signal CLKB is detected. That is, the count control unit 40 controls the UD counter to perform down-counting in the periods d1, d3, d5, d7, d9, . . . which are odd-numbered exposure periods. Further, the UD counter 32 is controlled to perform up-counting in the periods d2, d4, d6, d8, . . . which are even-numbered exposure periods. After the periods d2, d4, d6, d8, . . . which are the even-numbered exposure periods have elapsed, the event determination process in the determination unit 50 is performed.

The control signal CNT_SEL is controlled to high-level during the periods dth1, dth2, dth3, dth4, . . . during which the determination process is performed and is controlled to low-level during the other periods. In each of the periods dth1, dth2, dth3, dth4, . . . , the number of threshold value pulse signals corresponding to the threshold value th is input to the UD counter 32 via the selector SEL in accordance with the control signal CNT_SEL at high-level.

First, when the reset signal RES is supplied from the control unit 70 to the count control unit 40 at time t1s, the count control unit 40 generates a control signal CNT_RES that is the same as the reset signal RES and supplies the control signal CNT_RES to the UD counter 32. The UD counter 32 resets the count value to zero with the control signal CNT_RES as a trigger (Step S501).

At the time t1s, the count control unit 40 controls the control signal CNT_UD to low-level in response to a first rise of the signal CLKB after receiving the reset signal RES. The UD counter 32 starts down-counting in response to the low-level control signal CNT_UD and decrease the count value by one every time the pulse signal (photon detection signal) is output from the photoelectric conversion unit 20 (Step S502). The down-counting in the UD counter 32 continues until time t1e when the signal CLKB transitions from high-level to low-level next.

When the signal CLKB transitions from low-level to high-level again at the subsequent time t2s, the count control unit 40 controls the control signal CNT_UD from low-level to high-level in accordance with the rise of the signal CLKB. The UD counter 32 starts up-counting in response to the high-level control signal CNT_UD and increases the count value by one every time the pulse signal (photon detection signal) is output from the photoelectric conversion unit 20 (Step S503). The up-counting in the UD counter 32 starts from the count value at the time t1*e*, and continues until time t2*e* when the signal CLKB transitions from high-level to low-level next. As a result, as the count value at the time t2*e*, a difference value between the count value in the period d2 and the count value in the period d1 is obtained.

At the subsequent time t2*e*, when the signal CLKB transitions to low-level and the control signal CNT_SEL transitions to high-level, the period dth1, which is the determination period, starts. In the determination period, an additional count corresponding to a predetermined threshold value is performed with respect to the count value at the time when the immediately preceding exposure period (period d2) ends (Step S504). The count control unit 40 sets the control signal CNT_UD according to the sign of the count value at the time when the immediately preceding exposure period (period d2) ends. For example, when the count value in the immediately preceding exposure period is a negative value, the control signal CNT_UD is set to high-level (up-counting), and when the count value in the immediately preceding exposure period is a positive value, the control signal CNT_UD is set to low-level (down-counting). For example, in the case of the driving example of FIG. 19, the count value at time t2*e*, which is the end of the period d2, is a negative value. Thus, the control signal CNT_UD transitions to high-level, and an additional up-counting corresponding to the threshold value th is performed from the count value at the time t2*e*.

The sign determination unit 54 performs the event determination process based on the relationship between the sign of the count value at the time when the immediately preceding exposure period (period d2) ends and the sign of the count value after the additional count corresponding to the threshold value is performed (Step S505). Specifically, when the sign of the count value after the additional count corresponding to the threshold value is inverted from the sign of the count value in the immediately preceding exposure period, it is determined that there is no event, and 0 is output as the event value. When the count value after the additional count corresponding to the threshold value is maintained at the same negative value as the count value in the immediately preceding exposure period, it is determined that the event is an off-event, and −1 is output as the event value. When the count value after the additional count corresponding to the threshold value is maintained at the same positive value as the count value in the immediately preceding exposure period, it is determined that the event is an on-event, and 1 is output as the event value.

At the subsequent time t3*s*, the count control unit 40 generates the control signal CNT_RES and supplies the control signal CNT_RES to the UD counter 32. The UD counter 32 resets the count value to zero with the control signal CNT_RES as a trigger (Step S506). Thereafter, the process returns to Step S502, and the process from Step S502 to Step S506 are repeated in the same manner as the process from the time t1*s* to the time t3*s*.

In the driving example of FIG. 19, in the periods dth1 and dth2, additional up-counting is performed according to the negative count value in the immediately preceding exposure period, and in the periods dth3 and dth4, additional down-counting is performed according to the positive count value in the immediately preceding exposure period. In the determination processing in the periods dth1 and dth3, the sign of the count value is inverted. Thus, it is determined that there is no event, and 0 is output as the event value. In the determination process in the period dth2, the count value maintains a negative value. Thus, it is determined that the event is an off-event, and −1 is output as the event value. In the determination process in the period dth4, the count value maintains a positive value. Thus, it is determined that the event is an on-event, and 1 is output as the event value.

As described above, in the present embodiment, the presence or absence of occurrence of an event may be determined only by performing a counter process of adding or subtracting a threshold value and checking a change in the sign of a count value. Therefore, although the event detection frequency is reduced by the time of the counter process of adding or subtracting the threshold value, it is possible to reduce the number of arithmetic circuits necessary for the event determination.

Therefore, according to the present embodiment, it is possible to realize a photoelectric conversion device capable of detecting high-resolution events while suppressing the circuit scale.

Sixth Embodiment

Figure 20:
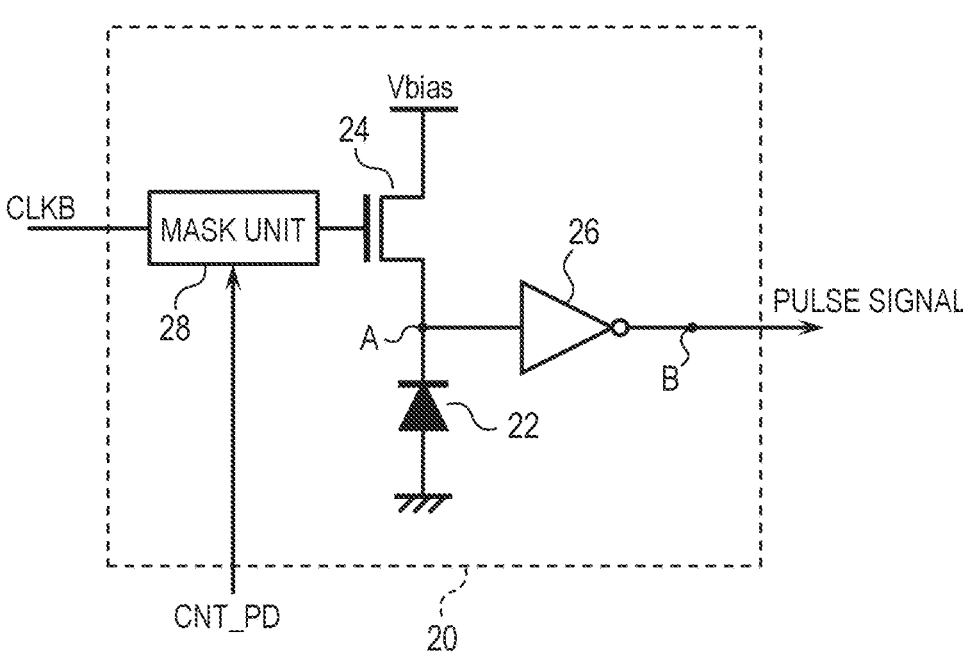
FIG. 20 is a circuit diagram illustrating a configuration example of a photoelectric conversion unit of a photoelectric conversion device according to a sixth embodiment.
Figure 21:
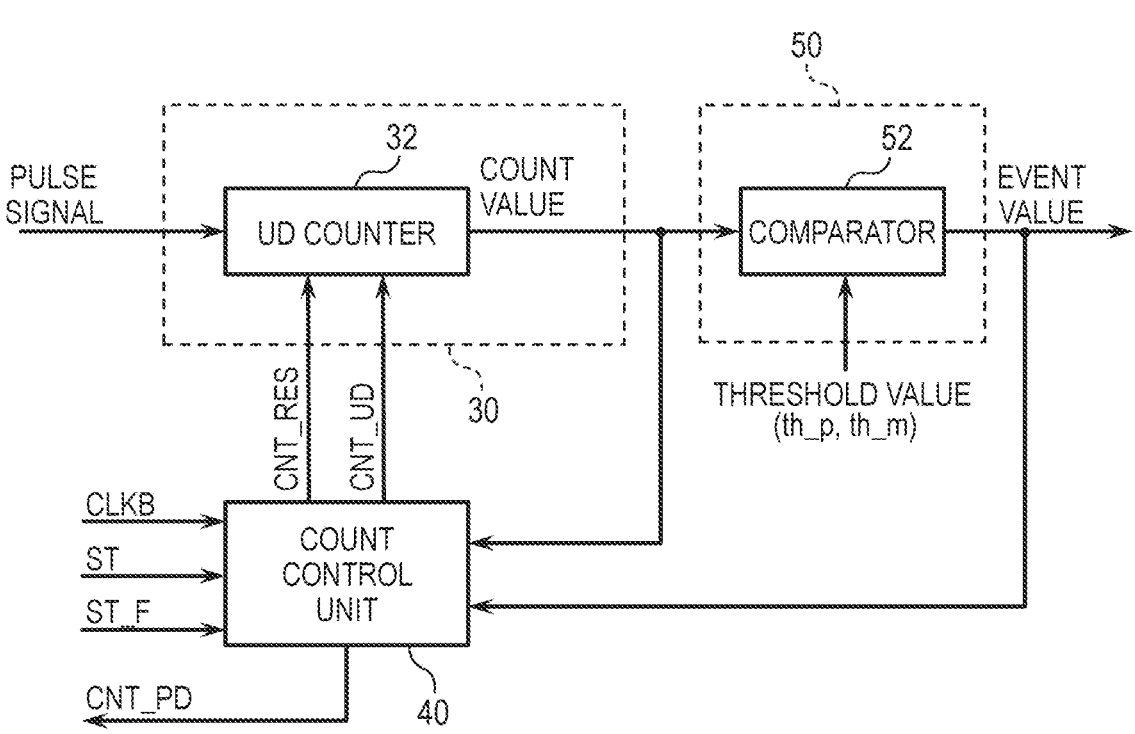
FIG. 21 is a block diagram illustrating a configuration example of a count unit, a count control unit, and a determination unit of the photoelectric conversion device according to the sixth embodiment.
Figure 22:
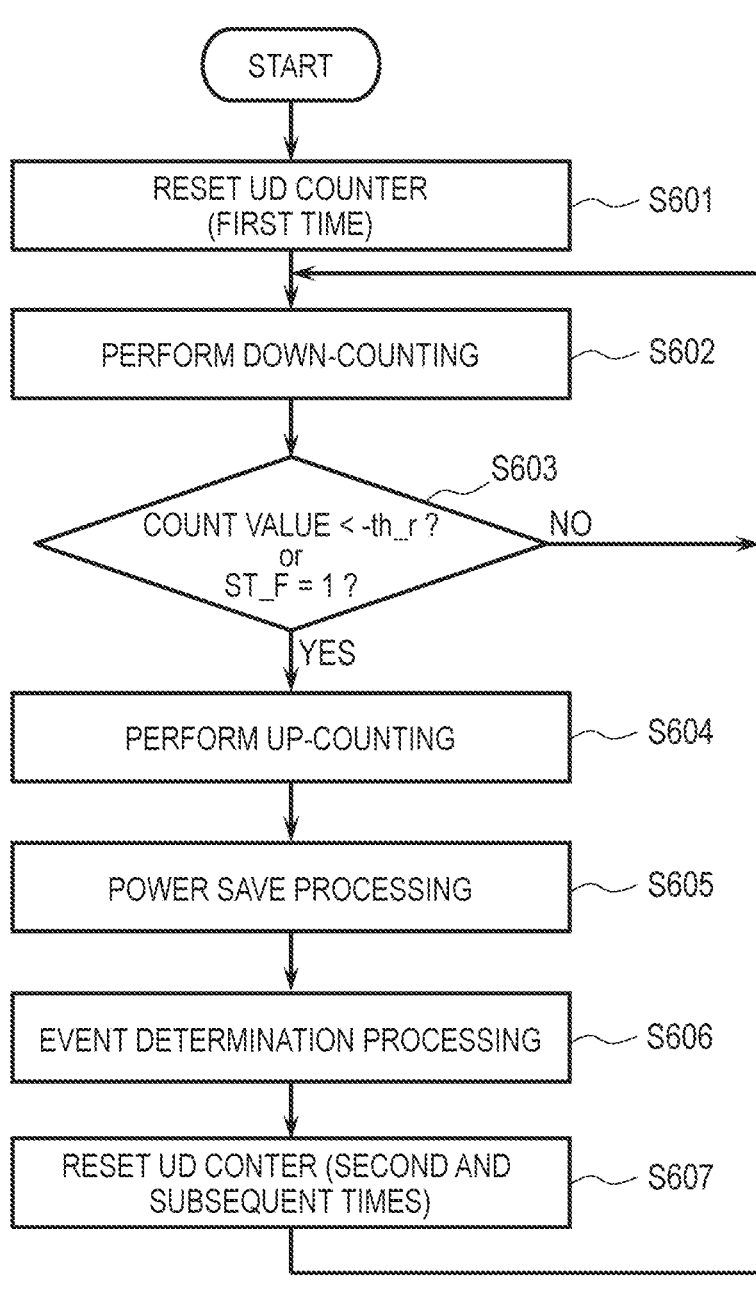
FIG. 22 is a flowchart illustrating a method of driving the photoelectric conversion device according to the sixth embodiment.
Figure 23:
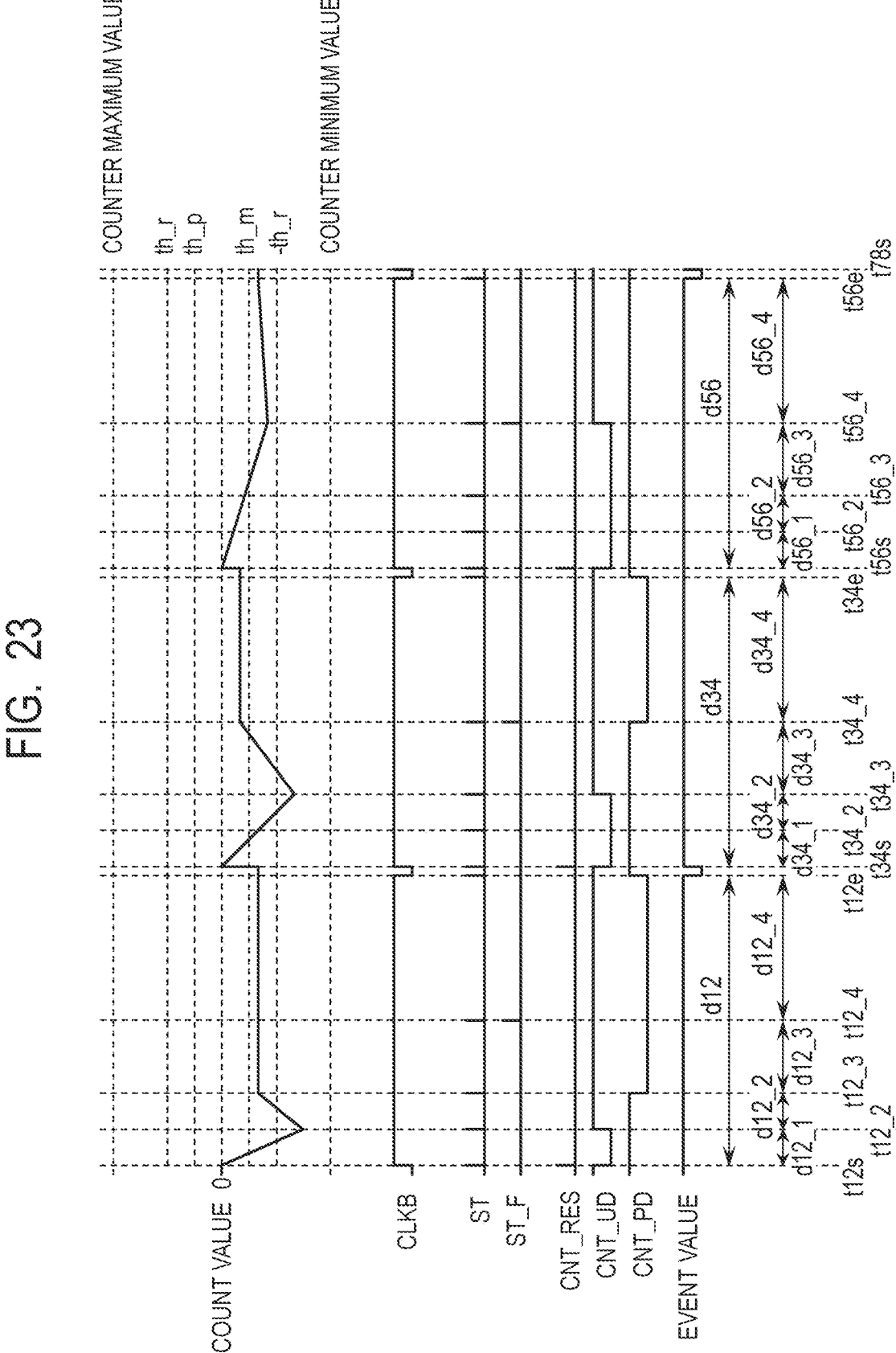
FIG. 23 is a timing chart illustrating a method of driving the photoelectric conversion device according to the sixth embodiment.

A photoelectric conversion device and a method of driving the same according to a sixth embodiment of the present disclosure will be described with reference to FIG. 20 to FIG. 23. FIG. 20 is a circuit diagram illustrating a configuration example of a photoelectric conversion unit of the photoelectric conversion device according to the present embodiment. FIG. 21 is a block diagram illustrating a configuration example of a count unit, a count control unit, and a determination unit of the photoelectric conversion device according to the present embodiment. FIG. 22 is a flowchart illustrating a method of driving the photoelectric conversion device according to the present embodiment. FIG. 23 is a timing chart illustrating a method of driving the photoelectric conversion device according to the present embodiment. The same components as those of the photoelectric conversion devices according to the first to fifth embodiments are denoted by the same reference numerals, and description thereof will be omitted or simplified.

In the first to fifth embodiments, it is assumed that the exposure periods of all the pixel units 12 are constant. For example, when an object is dark (at the time of shooting in a dark scene), the sensitivity is improved by increasing the cycle of the synchronization signal (signal CLKB) for determining the exposure period. On the other hand, when an object is bright (at the time of shooting in a bright scene), saturation (overflow of the counter) is avoided by shortening the cycle of the signal CLKB. However, in a case where a dark scene and a bright scene coexist, in order to preferably capture an image of both scenes, it is necessary to lengthen the cycle of the signal CLKB in accordance with the dark scene and secure a sufficient bit width of the counter so as not to be saturated in the bright scene. Therefore, the circuit scale is increased by the bit width of the counter.

In the present embodiment, a configuration and a driving method of a photoelectric conversion device capable of suitably capturing both a dark scene and a bright scene even when a bit width of a counter is small will be described.

The photoelectric conversion device according to the present embodiment is the same as the photoelectric conversion device according to the third embodiment except that the configurations of the photoelectric conversion unit 20, the count unit 30, the count control unit 40, and the determination unit 50 are different. In the present embodiment, differences from the photoelectric conversion device according to the third embodiment will be mainly described, and descriptions similar to those of the photoelectric conversion device according to the third embodiment will be appropriately omitted.

As illustrated in FIG. 20, the photoelectric conversion unit 20 of the photoelectric conversion device according to the present embodiment further includes a mask unit 28 in addition to the photoelectric conversion element 22, the switch unit 24, and the waveform shaping unit 26. The photoelectric conversion element 22 may be configured by an APD. The switch unit 24 may be formed of, for example, an n-channel MOS transistor. The waveform shaping unit 26 may be configured by a logic circuit such as an inverter circuit. The mask unit 28 is a logic circuit that outputs a signal according to the signal CLKB and the control signal CNT_PD. The control signal CNT_PD is an output signal of the count control unit 40.

An anode of the APD constituting the photoelectric conversion element 22 is connected to the ground voltage node. A cathode of the APD constituting the photoelectric conversion element 22 is connected to a source of the n-channel MOS transistor constituting the switch unit 24. A drain of the n-channel MOS transistor constituting the switch unit 24 is connected to a node to which the voltage Vbias is supplied. An input node of the waveform shaping unit 26 is connected to a connection node (node-A) between the photoelectric conversion element 22 and the switch unit 24. An output node (node-B) of the waveform shaping unit 26 corresponds to an output node of the photoelectric conversion unit 20. The output signal of the mask unit 28 is input to a gate of the n-channel MOS transistor constituting the switch unit 24.

The mask unit 28 is a logic circuit that outputs a high-level signal when the signal CLKB and the control signal CNT_PD are at high-level, and outputs a low-level signal when at least one of the signal CLKB and the control signal CNT_PD is at low-level. That is, the mask unit 28 supplies a result of the logical conjunction of the signal CLKB and the control signal CNT_PD to the gate of the n-channel MOS transistor constituting the switch unit 24.

The operation of the photoelectric conversion unit 20 when a single photon enters the APD will be described below. When the signal CLKB and the control signal CNT_PD transitions to high-level and the switch unit 24 is turned on, the voltage Vbias is applied to the anode of the APD through the switch unit 24, and the node-A is at high-level. When a photon enters the APD in this state, an electron-hole pair is generated by photoelectric conversion, and an avalanche multiplication phenomenon occurs by using these carriers as seeds. When an avalanche current flows through the APD due to the avalanche multiplication phenomenon, a voltage drop occurs due to the resistance component (quenching resistance) of the switch unit 24, and the bias voltage applied to the APD starts to drop. When the bias voltage drops to the breakdown voltage, the avalanche multiplication phenomenon stops, and the node-A is at low-level. As a result, no avalanche current flows through the APD, the voltage Vbias is again applied to the cathode of the APD, and the node-A returns to high-level.

As a result, the voltage of the node-A transitions from high-level to low-level along with the incidence of the photon on the APD, and then transitions from low-level to high-level. As a result, the output signal of the waveform shaping unit 26, that is, the voltage of the node-B transitions from low-level to high-level and then transitions from high-level to low-level in response to the change in the signal level of the node-A. The pulse signal output in this manner corresponds to a photon detection signal indicating that a photon has entered the photoelectric conversion element 22.

Next, a configuration example of the count unit 30, the count control unit 40, and the determination unit 50 included in the pixel unit 12 will be described with reference to FIG. 21. As illustrated in, e.g., FIG. 21, the count unit 30 includes a UD counter 32 capable of performing both up-counting and down-counting. The determination unit 50 includes a comparator 52.

The count control unit 40 receives the signal CLKB and the control signals ST and ST_F that are timing signals for switching the count direction from the control unit 70, the count value from the count unit 30, and the event value from the determination unit 50. The count control unit 40 generates a control signal CNT_PD of the photoelectric conversion unit 20 and control signals CNT_RES and CNT_UD of the UD counter 32 based on the above received signals. Here, the control signal CNT_PD is a signal for stopping (power saving) the imaging operation in the photoelectric conversion unit 20. For example, the photoelectric conversion unit 20 is in an operation state when the control signal CNT_PD is at high-level and is in a stop state when the control signal CNT_PD is at low-level.

Next, a method of driving the photoelectric conversion device according to the present embodiment will be described with reference to FIG. 22 and FIG. 23. FIG. 23 illustrates the count value, the maximum value, and the minimum value of the UD counter 32, the event value that is the output of the determination unit 50, and the waveforms of the signal CLKB and the control signals ST, ST_F, CNT_RES, CNT_UD, and CNT_PD.

In the driving method according to the present embodiment, each of the periods (the periods d12, d34, and d56 in FIG. 23) in which the signal CLKB is continuously at high-level includes two exposure periods. In one of the exposure period, down-counting is performed. In the other exposure period, up-counting is performed. Each process executed when the signal CLKB is at high-level is executed in synchronization with the control signal ST. During the period in which the signal CLKB is at high-level, the control signal ST at high-level is output five times, for example. The first control signal ST corresponds to the rising edge of the signal CLKB, and the last (fifth) control signal ST corresponds to the falling edge of the signal CLKB. The interval at which the control signal ST is output during the period in which the signal CLKB is at high-level is set to be sequentially increased by a power of 2. In other words, the plurality of periods divided by the control signal ST constitute a plurality of sub-periods whose lengths are sequentially increased by a power of 2. For example, in the period d12 in FIG. 23, the length of the period d12_2 is two to the power of zero times (=one times) the length of the period d12_1, the length of the period d12_3 is two to the power of one times (=two times) the length of the period d12_1, and the length of the period d12_4 is two to the power of two times (=four times) the length of the period d12_1. The control signal ST_F is output in synchronization with the second control signal ST from the end (fourth control signal from the start) during the period in which the signal CLKB is at high-level.

In the driving method of the present embodiment, the exposure period in which the down-counting is performed and the exposure period in which the up-counting is performed may be independently set in each of the plurality of pixel units 12 constituting the pixel array unit 10.

First, at time t12*s*, the count control unit 40 outputs the control signal CNT_RES to the UD counter 32 in response to the rise of the signal CLKB. The UD counter 32 resets the count value to zero with the control signal CNT_RES as a trigger (Step S601).

At the time t12*s*, the count control unit 40 also controls the control signal CNT_UD to low-level in response to the rise of the signal CLKB. The UD counter 32 starts down-counting in response to the low-level control signal CNT_UD and decreases the count value by one every time the pulse signal (photon detection signal) is output from the photoelectric conversion unit 20 (Step S602). At this time, the control signal CNT_PD is at high-level, and the photoelectric conversion unit 20 is in a state capable of outputting a pulse signal.

At time t12_2 at which the control signal ST is received next, the count control unit 40 determines whether the count value of the UD counter 32 is smaller than a predetermined value (−th_r), or whether or not the control signal ST_F is at high-level (Step S603). As a result of the determination, when the count value of the UD counter 32 is equal to or larger than the predetermined value (−th_r) and the control signal ST_F is at low-level ("NO" in Step S603), the process returns to Step S602 to continue the down-counting. When the count value of the UD counter 32 is smaller than the predetermined value (−th_r) or the control signal ST_F is at high-level ("YES" in Step S603), the process proceeds to Step S604. In the driving example of FIG. 23, since the count value of the UD counter 32 at time t12_2 is smaller than the predetermined value (−th_r), the process proceeds to Step S604.

Here, the predetermined value th_r used as the determination reference may be set to, for example, a value of one half of the maximum count value of the UD counter 32. That is, if the absolute value of the current count value does not exceed the value of one half of the maximum count value, the down-counting is continued, and if the absolute value of the current count value exceeds the value of one half of the maximum count value, the process proceeds to Step S604, and the count direction is switched. In this way, each pixel determines the timing of switching from down-counting to up-counting according to the count value of the own UD counter 32.

Note that, in case that the predetermined value th_r is set to a value of one half of the maximum count value, only monitoring the most significant bit excluding the sign bit of the count value is required to determine whether or not the predetermined value th_r exceeds the value of one half of the maximum count value. That is, if the most significant bit of the count value is 1, it may be determined that the absolute value of the count value is equal to or larger than one half of the maximum count value of the UD counter 32.

At the subsequent time t12_2, the count control unit 40 controls the control signal CNT_UD from low-level to high-level in accordance with the count value of the UD counter 32 and the control signal ST. The UD counter 32 starts up-counting in response to the high-level control signal CNT_UD and increases the count value by one every time the pulse signal (photon detection signal) is output from the photoelectric conversion unit 20 (Step S604). The up-counting in the UD counter 32 is started from the count value at the time t12_2, and continues until time t12_3 at which the control signal ST is received next. As a result, as the count value at the time t12_3, a difference value between the count value in the period d12_2 and the count value in the period d12_1 is obtained. Note that the length of the period d12_1 is equal to the length of the period d12_2.

At the subsequent time t12_3, the count control unit 40 controls the control signal CNT_PD from high-level to low-level in accordance with the control signal ST. The output signal of the mask unit 28 transitions to low-level in response to the low-level control signal CNT_PD, and the n-channel MOS transistor of the switch unit 24 is turned off. Accordingly, the output of the pulse signal (photon detection signal) from the photoelectric conversion unit 20 is stopped, and wasteful power consumption may be reduced (Step S605: power saving process). Even after the control signal CNT_PD transitions to low-level, the count value at the time t12_3 is held in the UD counter 32.

At the subsequent time t12*e*, the signal CLKB transitions from high-level to low-level, and the exposure period ends. The determination unit 50 performs event determination processing based on the count value of the UD counter 32 and the threshold values th_p and th_m in response to the fall of the signal CLKB (Step S606). The event determination result is output to the outside of the pixel unit 12 and the count control unit 40 as an event value. In addition, the count control unit 40 controls the control signal CNT_PD from low-level to high-level in response to the fall of the signal CLKB.

At the subsequent time t34*s*, the count control unit 40 outputs the control signal CNT_RES at high-level to the UD counter 32 in response to the rise of the signal CLKB. The UD counter 32 resets the count value to zero with the control signal CNT_RES as a trigger (Step S607). Thereafter, the process returns to Step S602, and the process from Step S602 to Step S607 is sequentially repeated for the periods d34, d56, . . . in the same manner as the process in the period d12.

In the period d34, down-counting is performed in the periods d34_1 and d34_2, and up-counting is performed in the period d34_3. As a result, a difference value between the count value in the period d34_3 and the count value in the periods d34_1 and d34_2 is obtained as the count value at time t34_4. The total length of the periods d34_1 and d34_2 is the same as the length of the period d34_3.

In the period d56, down-counting is performed in the periods d56_1, d56_2, and d56_3. At time t56_4, which is the end time of the period d56_3, the count value of the UD counter 32 is larger than the predetermined value (−th_r), while the control signal ST_F is supplied (ST_F=1). Thus, the down-counting is forcibly ended and the up-counting is started. As a result, a difference value between the count value in the period d56_4 and the count value in the periods d56_1, d56_2, and d56_3 is obtained as the count value at the time t56*e*. The total length of the periods d56_1, d56_2, and d56_3 is equal to the length of the period d56_4.

In this manner, by controlling the down-counting and the up-counting using the control signal ST whose interval is changed by a power of two, it is possible to obtain the difference value by making the lengths of the down-counting period and the up-counting period equal to each other while preventing the overflow of the count value.

As described above, in the present embodiment, the down-counting and the up-counting are always repeated regardless of the occurrence or non-occurrence of the event, and the count value is monitored for each pixel unit 12 to prevent the overflow. Accordingly, it is possible to reduce the bit width of the UD counter 32.

Note that even when the above-described driving method is used, overflow of the count value is not necessarily prevented. For example, in the period d34, the count value does not fall below the predetermined value (−th_r) at the time t34_2. Thus, the down-counting is continued also in the period d34_2. However, if the light amount significantly increases in the period d34_2, overflow of the count value may occur. As a measure for avoiding the overflow, for example, the predetermined value (th_r) with respect to the maximum count value may be set to be smaller, for example, set to ¼ of the maximum count value. The above setting allows to reduce the probability that the count value overflows. Alternatively, since the occurrence of overflow results from a large change in the amount of light, overflow may be detected as an event.

Therefore, according to the present embodiment, it is possible to realize a photoelectric conversion device capable of detecting high-resolution events detection while suppressing the circuit scale.

Seventh Embodiment

A photoelectric conversion system according to a seventh embodiment of the present disclosure will be described with reference to FIG. 25. FIG. 25 is a block diagram illustrating a schematic configuration of a photoelectric conversion system according to the present embodiment.

The photoelectric conversion device 100 described in the first to sixth embodiments may be applied to various photoelectric conversion systems. Examples of applicable photoelectric conversion systems include digital still cameras, digital camcorders, surveillance cameras, copying machines, facsimiles, mobile phones, on-vehicle cameras, observation satellites, and the like. A camera module including an optical system such as a lens and an imaging device is also included in the photoelectric conversion system. FIG. 25 exemplifies a block diagram of a digital still camera as one of these.

The photoelectric conversion system 200 illustrated in FIG. 25 includes an imaging device 201, a lens 202 that forms an optical image of an object on the imaging device 201, an aperture 204 that changes the amount of light passing through the lens 202, and a barrier 206 that protects the lens 202. The lens 202 and the aperture 204 form an optical system that focuses light onto the imaging device 201. The imaging device 201 is the photoelectric conversion device 100 described in any of the first to sixth embodiments, and converts the optical image formed by the lens 202 into image data.

The photoelectric conversion system 200 further includes a signal processing unit 208 that processes an output signal output from the imaging device 201. The signal processing unit 208 generates image data from the digital signal output from the imaging device 201. Further, the signal processing unit 208 performs various corrections and compressions as necessary and outputs the processed image data. The imaging device 201 may include an AD conversion unit that generates a digital signal to be processed by the signal processing unit 208. The AD conversion unit may be formed on a semiconductor layer (semiconductor substrate) on which the photoelectric conversion unit of the imaging device 201 is formed or may be formed on a semiconductor layer (semiconductor substrate) different from the semiconductor layer (semiconductor substrate) on which the photoelectric conversion unit of the imaging device 201 is formed. The signal processing unit 208 may be formed on the same semiconductor layer (semiconductor substrate) as the imaging device 201.

The photoelectric conversion system 200 further includes a memory unit 210 for temporarily storing image data and an external interface unit (external I/F unit) 212 for communicating with an external computer or the like. The photoelectric conversion system 200 further includes a storage medium 214 such as a semiconductor memory for performing storing or reading out of imaging data, and a storage medium control interface unit (storage medium control I/F unit) 216 for performing storing on or reading out from the storage medium 214. The storage medium 214 may be built in the photoelectric conversion system 200 or may be detachable.

The photoelectric conversion system 200 further includes a general control/operation unit 218 that performs various calculations and controls the entire digital still camera, and a timing generation unit 220 that outputs various timing signals to the imaging device 201 and the signal processing unit 208. Here, the timing signal or the like may be input from the outside, and the photoelectric conversion system 200 may include at least the imaging device 201 and the signal processing unit 208 that processes the output signal output from the imaging device 201.

The imaging device 201 outputs an imaging signal to the signal processing unit 208. The signal processing unit 208 performs predetermined signal processing on the imaging signal output from the imaging device 201, and outputs the processed image data. The signal processing unit 208 generates an image using the imaging signal.

As described above, according to the present embodiment, it is possible to realize a photoelectric conversion system to which the photoelectric conversion device 100 according to the first to sixth embodiments is applied.

Eighth Embodiment

Figure 26A:
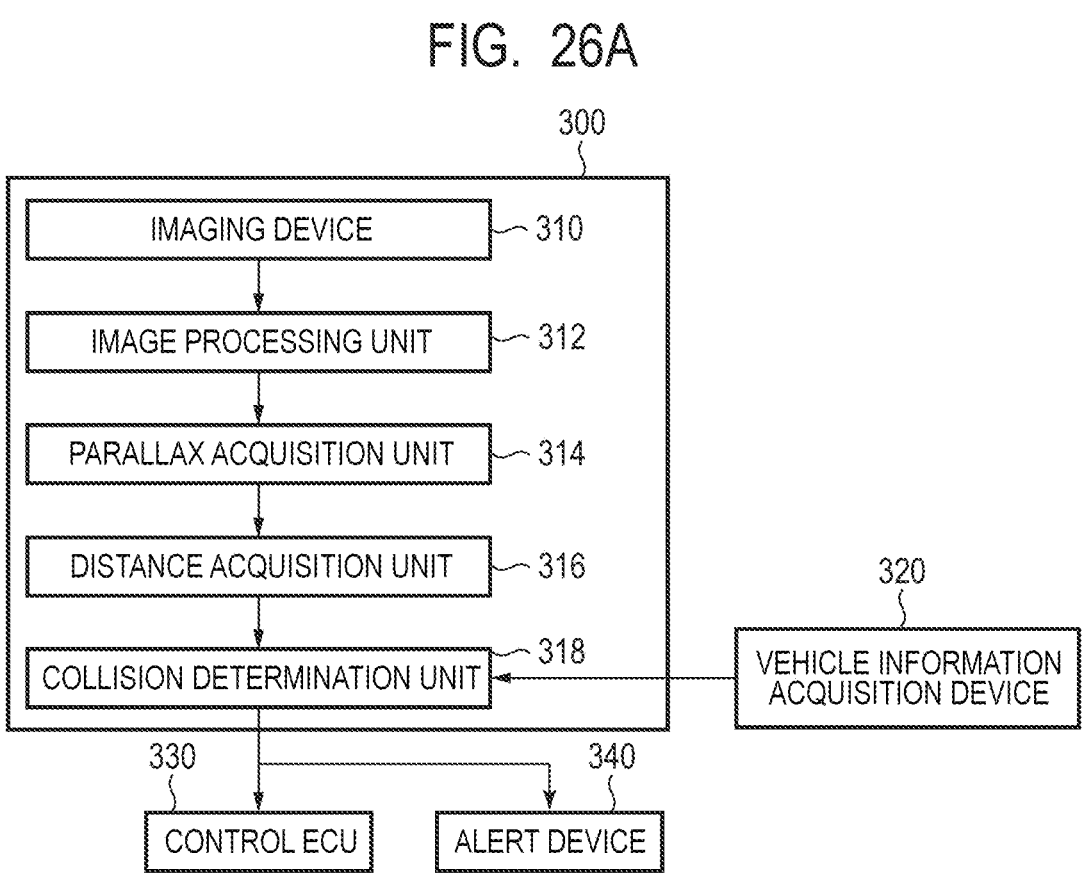
FIG. 26A is a diagram illustrating a configuration example of an imaging system according to an eighth embodiment.
Figure 26B:
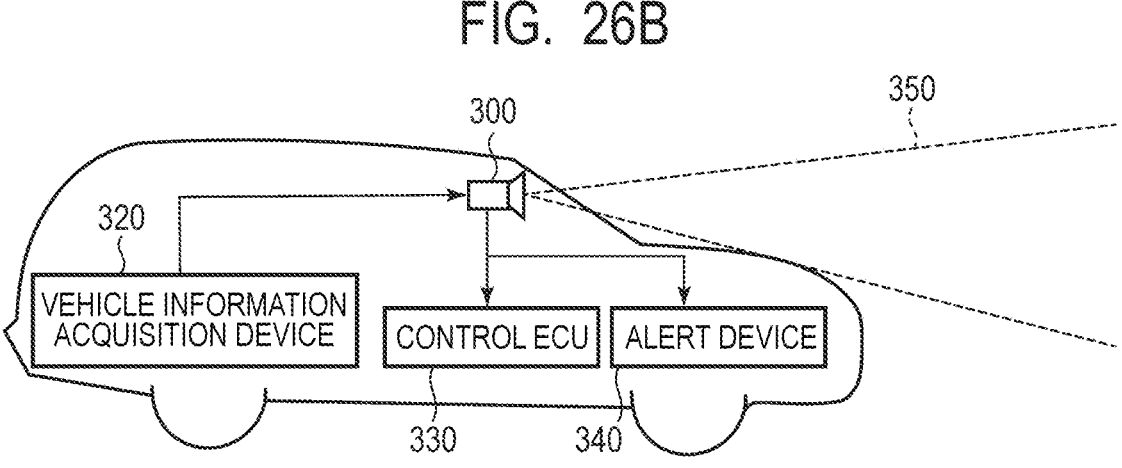
FIG. 26B is a diagram illustrating a configuration example of a movable object according to the eighth embodiment.

A photoelectric conversion system and a movable object according to an eighth embodiment of the present disclosure will be described with reference to FIG. 26A and FIG. 26B. FIG. 26A is a diagram illustrating a configuration of a photoelectric conversion system according to the present embodiment. FIG. 26B is a diagram illustrating a configuration of a movable object according to the present embodiment.

FIG. 26A illustrates an example of a photoelectric conversion system related to an on-vehicle camera. The photoelectric conversion system 300 includes an imaging device 310. The imaging device 310 is the photoelectric conversion device 100 according to any one of the first to sixth embodiments. The photoelectric conversion system 300 includes an image processing unit 312 that performs image processing on a plurality of image data acquired by the imaging device 310, and a parallax acquisition unit 314 that calculates parallax (phase difference of parallax images) from the plurality of image data acquired by the imaging device 310. The photoelectric conversion system 300 further includes a distance acquisition unit 316 that calculates a distance to an object based on the calculated parallax, and a collision determination unit 318 that determines whether there is a collision possibility based on the calculated distance. Here, the parallax acquisition unit 314 and the distance acquisition unit 316 are examples of a distance information acquisition unit that acquires distance information to the object. That is, the distance information is information related to a parallax, a defocus amount, a distance to the object, and the like. The collision determination unit 318 may determine the collision possibility using any of the distance information. The distance information acquisition unit may be realized by dedicatedly designed hardware or may be realized by a software module. Further, it may be realized by a field programmable gate array (FPGA), an application specific integrated circuit (ASIC), or the like, or may be realized by a combination of these.

The photoelectric conversion system 300 is connected to the vehicle information acquisition device 320 and may acquire vehicle information such as a vehicle speed, a yaw rate, and a steering angle. Further, the photoelectric conversion system 300 is connected to a control ECU 330 which is a control device that outputs a control signal for generating a braking force to the vehicle based on the determination result of the collision determination unit 318. The photoelectric conversion system 300 is also connected to an alert device 340 that issues an alert to the driver based on the determination result of the collision determination unit 318. For example, when the determination result of the collision determination unit 318 indicates that the possibility of collision is high, the control ECU 330 performs vehicle control to avoid collision and reduce damage by, for example, applying a brake, returning an accelerator, or suppressing engine output. The alert device 340 gives an alert to the user by sounding an alarm such as a sound, displaying alert information on a screen of a car navigation system or the like, giving vibration to a seat belt or a steering wheel, or the like.

In the present embodiment, an image of the surroundings of the vehicle, for example, the front or the rear is captured by the photoelectric conversion system 300. FIG. 26B illustrates the photoelectric conversion system in the case of capturing an image in front of the vehicle (imaging range 350). The vehicle information acquisition device 320 sends an instruction to the photoelectric conversion system 300 or the imaging device 310. With such a configuration, the accuracy of distance measurement may be further improved.

Although an example in which control is performed so as not to collide with another vehicle has been described above, the present invention is also applicable to control in which automatic driving is performed so as to follow another vehicle, control in which automatic driving is performed so as not to protrude from a lane, and the like. Further, the photoelectric conversion system is not limited to a vehicle such as an own vehicle, and may be applied to, for example, other movable objects (mobile devices) such as a ship, an aircraft, and an industrial robot. In addition, the present invention is not limited to the movable object and may be widely applied to equipment using object recognition, such as intelligent transport systems (ITS).

Ninth Embodiment

Figure 27:
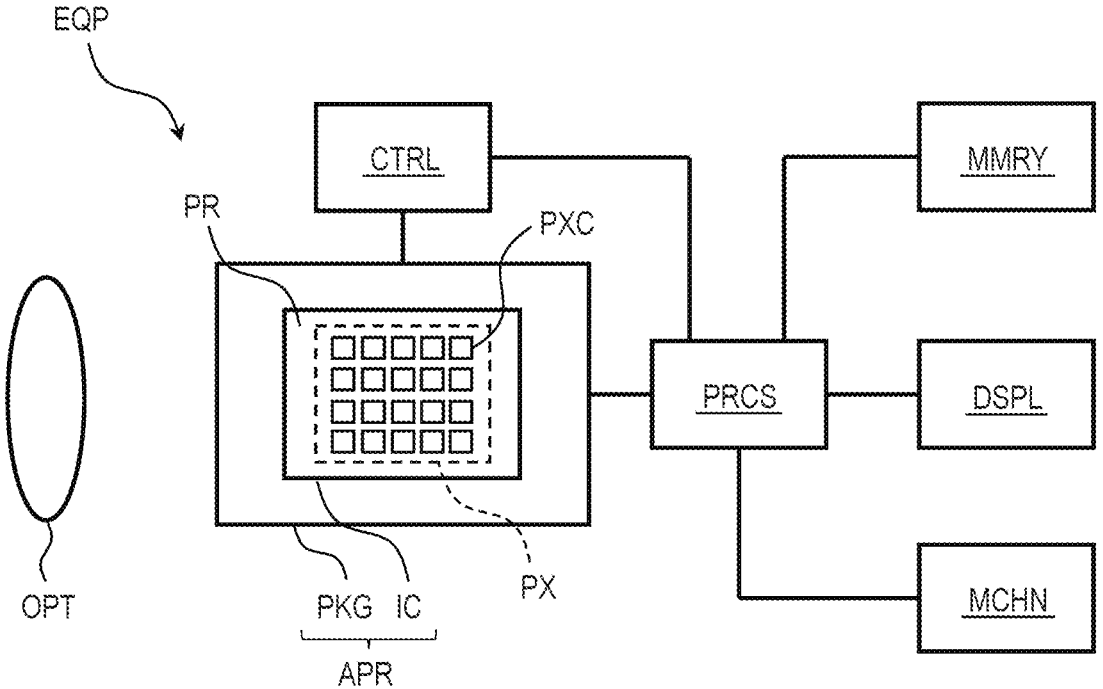
FIG. 27 is a block diagram illustrating a schematic configuration of an equipment according to a ninth embodiment.

An Equipment according to a ninth embodiment of the present disclosure will be described with reference to FIG. 27. FIG. 27 is a block diagram illustrating a schematic configuration of an equipment according to the present embodiment.

FIG. 27 is a schematic diagram illustrating an equipment EQP including a photoelectric conversion device APR. The photoelectric conversion device APR has the function of the photoelectric conversion device 100 according to any of the first to sixth embodiments. All or part of the photoelectric conversion device APR is a semiconductor device IC. The photoelectric conversion device APR of the present example can be used as, for example, an image sensor, an auto focus (AF) sensor, a photometric sensor, or a distance measurement sensor. The semiconductor device IC includes a pixel region PX in which pixel circuits PXC each including a photoelectric conversion unit are arranged in a matrix. The semiconductor device IC may include a peripheral region PR around the pixel region PX. A circuit other than the pixel circuit may be disposed in the peripheral region PR.

The photoelectric conversion device APR may have a structure (chip stacked structure) in which a first semiconductor chip provided with a plurality of photoelectric conversion units and a second semiconductor chip provided with peripheral circuits are stacked. Each of the peripheral circuits in the second semiconductor chip may be column circuits corresponding to pixel columns of the first semiconductor chip. The peripheral circuits in the second semiconductor chip may be matrix circuits corresponding to pixels or pixel blocks in the first semiconductor chip. As the connection between the first semiconductor chip and the second semiconductor chip, a through electrode (through silicon via (TSV)), an inter-chip interconnection by direct bonding of a conductor such as copper, a connection by a micro bump between chips, a connection by wire bonding, or the like may be employed.

The photoelectric conversion device APR may include a package PKG that accommodates the semiconductor device IC in addition to the semiconductor device IC. The package PKG may include a base body to which the semiconductor device IC is fixed, a lid body such as glass facing the semiconductor device IC, and connection members such as bonding wires or bumps for connecting terminals provided on the base body and terminals provided on the semiconductor device IC.

The equipment EQP may further include at least one of an optical device OPT, a control device CTRL, a processing device PRCS, a display device DSPL, a storage device MMRY, and a mechanical device MCHN. The optical device OPT corresponds to the photoelectric conversion device APR as a photoelectric conversion device, and is, for example, a lens, a shutter, or a mirror. The control device CTRL controls the photoelectric conversion device APR, and is, for example, a semiconductor device such as an ASIC. The processing device PRCS processes a signal output from the photoelectric conversion device APR and constitutes an analog front end (AFE) or a digital front end (DFE). The processing unit PRCS is a semiconductor device such as a central processing unit (CPU) or an ASIC. The display device DSPL may be an electroluminescent (EL) display device or a liquid crystal display device that displays information (image) obtained by the photoelectric conversion device APR. The storage device MMRY may be a magnetic device or a semiconductor device that stores information (image) obtained by the photoelectric conversion device APR. The storage device MMRY may be a volatile memory such as a static random access memory (SRAM) or a dynamic random access memory (DRAM), or a nonvolatile memory such as a flash memory or a hard disk drive. The mechanical device MCHN may include a movable portion or a propulsion portion such as a motor or an engine. In the equipment EQP, a signal output from the photoelectric conversion device APR is displayed on the display device DSPL or transmitted to the outside by a communication device (not illustrated) included in the equipment EQP. Therefore, it is preferable that the equipment EQP further includes a storage device MMRY and a processing device PRCS separately from the storage circuit unit and the arithmetic circuit unit included in the photoelectric conversion device APR.

The equipment EQP illustrated in FIG. 27 may be an electronic device such as an information terminal (for example, a smartphone or a wearable terminal) having a photographing function or a camera (for example, an interchangeable lens camera, a compact camera, a video camera, and a monitoring camera). The mechanical device MCHN in the camera may drive components of the optical device OPT for zooming, focusing, and shutter operation. The equipment EQP may be a transportation device (movable object) such as a vehicle, a ship, or an airplane. The equipment EQP may be a medical device such as an endoscope or a CT scanner.

The mechanical device MCHN in the transport device may be used as a mobile device. The equipment EQP as a transport device is suitable for transporting the photoelectric conversion device APR, or for assisting and/or automating operation (manipulation) by an imaging function. The processing device PRCS for assisting and/or automating driving (manipulation) may perform processing for operating the mechanical device MCHN as a mobile device based on information obtained by the photoelectric conversion device APR.

The photoelectric conversion device APR according to the present embodiment may provide a high value to a designer, a manufacturer, a seller, a purchaser, and/or a user thereof. Therefore, when the photoelectric conversion device APR is mounted on the equipment EQP, the value of the equipment EQP may also be increased. Therefore, in manufacturing and selling the equipment EQP, it is advantageous to determine the mounting of the photoelectric conversion device APR of the present embodiment on the equipment EQP in order to increase the value of the equipment EQP.

MODIFIED EMBODIMENTS

The present disclosure is not limited to the above-described embodiments, and various modifications are possible.

For example, an example in which a part of the configuration of any of the embodiments is added to another embodiment or an example in which a part of the configurations of any of the embodiments is substituted with some of the configurations of another embodiment is also an embodiment of the present disclosure. For example, the configuration of the first or second embodiment in which the count unit 30 includes the memory 34 may be combined with the configuration of the fifth embodiment in which the circuit configuration of the determination unit 50 is simplified.

Further, in the above-described embodiments, the method in which the up-counting is performed following the down-counting is exemplified, but the down-counting may be performed following the up-counting. That is, one of the up-counting and the down-counting may be performed in the first period of the exposure period, and the other of the up-counting and the down-counting may be performed in the next period of the exposure period. In this case, the sign of the event determination may be reversed from that in the above-described embodiments. Similarly, in the second embodiment, an example in which the counter 36 that performs up-counting is used has been described, but the counter 36 that performs down-counting may also be used.

Further, in the sixth embodiment, the exposure period determined by the high-level period of the signal CLKB is divided into four periods by the control signal ST, but the number of divided exposure periods is not limited to four and may be three or five or more.

Further, in the above-described embodiments, it is assumed that all of the pixel units 12 constituting the pixel array unit 10 are pixels intended only to detect an event, but a configuration in which frame information (count value information proportional to the amount of light) is simultaneously acquired may also be easily realized. For example, as illustrated in FIG. 24, the count unit 30 may output the count value to the readout unit 60 without intervening the determination unit 50.

However, in the above-described embodiments, there is a timing at which the counter indicates the difference value between the count values of the two exposure periods as the count value. Thus, in order to output the frame information, it is necessary to devise methods to output the count value based only on the count period in one direction. For example, in the first embodiment, the count value stored in the memory 34 may be output as the frame count value. In other embodiments, the count value in the exposure period immediately after resetting the count value may be output as the frame information.

Further, when the event pixel that outputs the event information and the frame pixel that outputs the frame information coexist, it is possible to arbitrarily select which pixel among the event pixel, the frame pixel, and the general-purpose pixel that can be used as the event pixel or the frame pixel is to be used as each pixel unit 12 constituting the pixel array unit 10. For example, all the pixel units 12 constituting the pixel array unit 10 may be general-purpose pixels. In addition, in the case of the color filter array of, e.g., FIG. 2C, the R pixel, the G pixel, and the B pixel may be set as the frame pixels, and the C pixel may be set as the event pixel.

The photoelectric conversion systems described in the seventh and eighth embodiments are examples of the photoelectric conversion systems to which the photoelectric conversion device of the present disclosure may be applied, and the photoelectric conversion system to which the photoelectric conversion device of the present disclosure may be applied is not limited to the configuration illustrated in FIG. 25 and FIG. 26A.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-211224, filed Dec. 14, 2023, which is hereby incorporated by reference herein in its entirety.

What is claimed is:

1. A photoelectric conversion device comprising:
a pixel unit including
    a photoelectric conversion unit configured to output a pulse signal in response to incidence of light;
    a count unit including a counter configured to count the pulse signal output from the photoelectric conversion unit during a predetermined exposure period and a count value holding unit configured to hold a count value of the counter;
    a count control unit configured to control the count unit; and
    a determination unit configured to perform a determination processing of determining whether or not there is a change in an amount of light incident on the photoelectric conversion unit based on a count value of the counter,
wherein the exposure period includes a plurality of periods including at least a first period and a second period,
wherein the count control unit is configured to control the count unit to output a difference value between a first count value in the first period and a second count value in the second period,
wherein the determination unit is configured to perform the determination processing based on the difference value,
wherein the count control unit is configured to control the counter, when the difference value is equal to or less than a predetermined threshold value, to read out the first count value held by the count value holding unit to the counter and start a count operation in a third period of the exposure period from the first count value, and
wherein the determination unit is configured to further perform the determination processing based on a difference value between the first count value and a third count value in the third period.

2. The photoelectric conversion device according to claim 1,
wherein the counter is enabled to perform up-counting and down counting, and
wherein the count control unit is configured to
    control, in the first period, the counter to perform one of the up-counting and the down-counting, and
    control, in the second period and the third period, the counter to perform the other of the up-counting and the down-counting and start a count operation from the first count value to generate the difference value.

3. The photoelectric conversion device according to claim 1, further comprising a sign inversion unit configured to invert a sign of a count value output from the count unit,
wherein the count control unit is configured to control the counter to start a count operation in the second period from a fourth count value obtained by inverting a sign of the first count value to generate the difference value.

4. The photoelectric conversion device according to claim 1, wherein the count control unit is configured to initialize a count value of the counter to zero to shift to a count operation of a next exposure period when the difference value exceeds the predetermined threshold value.

5. The photoelectric conversion device according to claim 1, wherein the count control unit is configured to initialize a count value of the counter to zero after the determination processing to shift to a count operation of a next exposure period.

6. The photoelectric conversion device according to claim 1,
wherein the count control unit is configured to
    initialize a count value of the counter to zero to shift to a count operation of a next exposure period when the difference value exceeds the predetermined threshold value, and
    not initialize the difference value held by the counter to shift to a next period of the exposure period when the difference value is equal to or less than the predetermined threshold value.

7. The photoelectric conversion device according to claim 1,
wherein the exposure period includes a plurality of sub-periods whose lengths sequentially increase by a power of two, and
wherein the count control unit is configured to perform a count operation of sub-period(s) until a count value of the counter exceeds a predetermined value as the first period and a count operation of a next one sub-period as the second period.

8. The photoelectric conversion device according to claim 7, wherein the predetermined value is determined based on a maximum count value of the counter.

9. The photoelectric conversion device according to claim 7, wherein the photoelectric conversion unit is configured to stop outputting the pulse signal in the sub-period(s) excluding the first period and the second period in the exposure period.

10. The photoelectric conversion device according to claim 7,
wherein the pixel unit comprises a plurality of pixel units, and
wherein the first period and the second period are independently set in each of the plurality of pixel units.

11. The photoelectric conversion device according to claim 1, wherein the determination unit includes a comparator configured to compare the difference value and the predetermined threshold value and determine that the amount of light has changed when the difference value exceeds the predetermined threshold value.

12. The photoelectric conversion device according to claim 11, wherein the determination unit is configured to output a first value when the difference value exceeds the predetermined threshold value and the second count value is larger than the first count value, output a second value when the difference value exceeds the predetermined threshold value and the first count value is larger than the second count value, and output a third value when the difference value is less than or equal to the predetermined threshold value.

13. The photoelectric conversion device according to claim 1,
wherein the count unit is configured to output an addition value obtained by adding a predetermined threshold value having a sign opposite to a sign of the difference value to the difference value, and
wherein the determination unit is configured to determine that the amount of light has changed when the second count value and the addition value are positive values or when the second count value and the addition value are negative values.

14. The photoelectric conversion device according to claim 13, wherein the determination unit is configured to output a first value when the second count value and the addition value is positive values, output a second value when the second count value and the addition value are negative values, and output a third value when a sign of the second count value is different from a sign of the addition value.

15. The photoelectric conversion device according to claim 1, wherein the count unit is configured to output the first count value and the second count value as a flame count value.

16. The photoelectric conversion device according to claim 1, wherein a length of the first period is the same as a length of the second period.

17. The photoelectric conversion device according to claim 1, wherein the photoelectric conversion unit includes an avalanche photodiode.

18. The photoelectric conversion device according to claim 1, wherein the count control unit is connected to the counter and the count value holding unit.

19. A photoelectric conversion system comprising:

the photoelectric conversion device according to claim 1; and a signal processing device configured to process a signal output from the photoelectric conversion device.

20. A movable object comprising:

the photoelectric conversion device according to claim 1;

a distance information acquisition unit configured to acquire distance information to an object from a parallax image based on a signal from the photoelectric conversion device; and a control unit configured to control the movable object based on the distance information.

21. An equipment comprising:

the photoelectric conversion device according to claim 1; and at least one of an optical device corresponding to the photoelectric conversion device, a control device configured to control the photoelectric conversion device, a processing device configured to process a signal output from the photoelectric conversion device, a mechanical device that is controlled based on information obtained by the photoelectric conversion device, a display device configured to display information obtained by the photoelectric conversion device, and a storage device configured to store information obtained by the photoelectric conversion device.

* * * * *